Jan. 26, 1954 J. A. MAHONEY ET AL 2,667,537

TELEGRAPH REPEATER

Filed July 6, 1951 6 Sheets-Sheet 1

INVENTORS J. A. MAHONEY
W. T. REA
C. B. SUTLIFF

BY John E. Cassidy

ATTORNEY

Jan. 26, 1954 J. A. MAHONEY ET AL 2,667,537

TELEGRAPH REPEATER

Filed July 6, 1951 6 Sheets-Sheet 2

INVENTORS J. A. MAHONEY
W. T. REA
C. B. SUTLIFF
BY John E. Cassidy
ATTORNEY

INVENTORS J. A. MAHONEY
W. T. REA
C. B. SUTLIFF
BY John E. Cassidy
ATTORNEY

TELEGRAPH REPEATER

Filed July 6, 1951 6 Sheets-Sheet 4

INVENTORS J. A. MAHONEY
W. T. REA
C. B. SUTLIFF

BY John E Cassidy

ATTORNEY

Jan. 26, 1954 J. A. MAHONEY ET AL 2,667,537

TELEGRAPH REPEATER

Filed July 6, 1951 6 Sheets-Sheet 5

INVENTORS J. A. MAHONEY
W. T. REA
C. B. SUTLIFF
BY John E. Cassidy
ATTORNEY

INVENTORS J. A. MAHONEY
W. T. REA
C. B. SUTLIFF
BY
John E. Cassidy
ATTORNEY

Patented Jan. 26, 1954 2,667,537

UNITED STATES PATENT OFFICE 2,667,537

TELEGRAPH REPEATER

Joseph A. Mahoney, New York, and Wilton T. Rea, Manhasset, N. Y., and Carleton B. Sutliff, Summit, N. J., assignors to Bell Telephone Laboratories, Incorporated, New York, N. Y., a corporation of New York Application July 6, 1951, Serial No. 235,458

11 Claims. (Cl. 178—70)

This invention relates to telegraph systems and more particularly to an improved telegraph repeater.

The repeater may for purpose of description be considered to comprise a line side which extends to a distant repeater station and a local side. In the present arrangement the line side may be quickly changed, by the manual operation of rotatable switches, so that the type of transmission between the present line repeater and a distant line repeater may be any of three types, namely, differential duplex, type A polarential and type B polarential.

The line repeater when in the differential duplex condition may be arranged for either normal or upset differential duplex operation.

The line repeater when in the type A polarential condition may be arranged as either the polar sending terminal or as the differential sending terminal.

The line repeater when in the type B polarential condition may be arranged as either the polar sending terminal or as the differential sending terminal.

The line between two repeater stations may be subject to different kinds and degrees of inductive disturbances. The present line repeater can be arranged through the operation of a rotatable switch, the Line switch, in three different manners to care for three different induction conditions.

In the first of these induction conditions the disturbance on the line due to induction is negligible and a single wire line is used to interconnect the two repeater stations and no induction suppression elements are inserted in the line.

In the second of these induction conditions the line between repeater stations is subject to 60-cycle inductive disturbance, the line between stations is arranged as a single wire line and elements are connected to the line to suppress 60-cycle currents.

In the third of these induction conditions the facility between repeaters is a two-wire line and the repeater is arranged so that all longitudinal disturbances are balanced out.

The line repeater of the present invention may be connected on the local side in two different manners. In the first manner of connection the line repeater is connected through a balanced loop circuit. In the second manner of connection the line repeater present is connected through an electronic coupling unit, or as it is otherwise known through an electronic control circuit, for connection to a hub-type repeater system.

When the local side of the present repeater is a balanced loop circuit, the present repeater may be extended on the local side in two different manners. First, it may be connected to a subscriber loop circuit. Second, it may be connected back to back with another balanced loop and line repeater such as that to be described herein to form what is termed a through repeater, which is an intermediate repeater in a tandem connection extending to a first distant repeater station, say to the East, and a second distant repeater station, say to the West. In this latter arrangement, at the through or intermediate point, a first line repeater is connected through its associated balanced loop to form one repeater which is connected through a second balanced loop and its associated line repeater forming the second repeater so that two line repeaters and two balanced loops such as those disclosed herein are provided at the through point. In this arrangement each of the balanced loops may be terminated in a test board. Alternatively when serving as a through or intermediate repeater one line repeater and one balanced loop such as that to be described herein may be employed and instead of a second line repeater and a second balanced loop such as that to be described herein another suitable balanced loop type repeater may be employed.

When the line repeater and balanced loop circuit described herein are interconnected, the local side of the circuit may be arranged in two different manners. It may be arranged for full-duplex operation or for half-duplex operation. In both the full-duplex and half-duplex arrangement the battery connections may be normal for one condition of operation or reversed for another condition of operation.

To facilitate changing from one to another of the various arrangements possible when the local side of the repeater is a balanced loop, the balanced loop circuit is also provided with a rotatable switch which may be manually operated to any of four discrete positions.

When the line repeater is connected through the electronic coupling unit into a hub-type repeater system, no corresponding options are available in the coupling circuit for connections on the local side and no switch corresponding to the loop switch is provided, as none is required.

To return to the line repeater portion of the present arrangement, it has been mentioned that three different transmission arrangements of the line extending to a distant repeater station are possible, namely, differential duplex, polarential A and polarential B. The line repeater is provided with two manually rotatable switches which cooperatively arrange the circuit for any one of the three options. These switches are called herein option switches and the two provided are identified on the drawings as the OPN1 and the OPN2 switches. The switch which adjusts the line repeater for the different induction conditions of the line is identified on the drawings as the Line switch. In addition to these there are three other manually rotatable multiunit switches shown on the drawings in the line side of the repeater which are employed to make various adjustments, which switches will now be described generally.

The first of these three switches is the apex switch, designated Apex on the drawings. It is employed to vary the resistance connected between the armature of the sending relay S and the apex of the receiving relay R, which is the junction between the path extending through the line winding of the receiving relay R to the line and the path extending through the balancing winding of the receiving relay R and the balancing network. There are two switching units or sections on the apex switch. The first section is employed for the above-described purpose. The second section is employed only when the two-wire line arrangement is used and is similarly connected to the apex of the second line. The two sections are actuable simultaneously through a common shaft. The reason for varying the resistance in the apex circuit will be made clear hereinafter.

A second of the three other rotatable switches in the line side of the repeater is the line pad switch or L Pad switch as it is designated on the drawings. There are four sections on the L Pad switch. Each section primarily comprises a resistance variable in discrete fixed amounts. One adjustable resistance may be connected in series with the transmission line. The second may be connected in series with the balancing line for the transmission line. The third is connected in series in the second or neutralizing wire when used and the fourth in a balancing circuit for the second wire. All four resistances are variable in discrete equal amounts in unison and their purpose may be understood from the description hereinafter.

The third of the rotatable multiunit switches in the line side of the repeater is the capacitance balance, or C Bal switch as it is designated on the drawings. It is arranged to connect a variable amount of capacitance in the balancing network and a corresponding amount in the neutralizing line when the neutralizing line is employed. It is a four-unit switch, two units associated with the balancing line and two with the neutralizing line. It affords zero capacitance or any one of eleven different amounts of capacitance in unit microfarad steps from 0 to 11 microfarads for twelve different switch settings.

One of the features of the invention is an improved balancing network.

Another feature of the invention is an improved bias control which affords substantially constant fineness of adjustment of relay bias current throughout the bias current range.

Another feature of the invention is an improved equalizer for effectively reducing the magnitude of the lower frequency components of the received signal in comparison with that of the higher frequency components in order to minimize the distorting effects of the line characteristics on the signal during transmission.

These and other features of the invention will become apparent from the following description when read with reference to the associated drawings in which Figs. 1, 2 and 3 taken together and disposed as in Fig. 4 disclose the improved repeater of the present invention with its local side arranged as a balanced loop.

Figs. 5, 6 and 7 taken together and disposed as in Fig. 8 disclose the improved repeater of the present invention with its local side arranged as an electronic coupling unit for connection in a hub repeater system.

In the following description where values of constants are given, it is to be understood that the values cited are by way of example.

Refer now to Figs. 1, 2 and 3 disposed as in Fig. 4.

Where the same conductor extends between two drawings, it is designated with the same letter on each drawing.

First the multicontact, multisection switches shown in Figs. 1, 2 and 3 will be described.

The circuit is equipped with seven multisection, multicontact switches of a type well known in the art. In Fig. 1, one of these switches is shown designated Loop. It comprises two switch sections designated A and B. Each switch section comprises a set of twelve contacts numbered 1 to 12 arranged in a circle about inner arcuate conducting segments. The twelve contacts project radially inwardly. The twelve contacts are stationary. They are of two different lengths. The arcuate segments are rotatable. In the normal or zero position of the switch the rotatable arcuate conducting segments are in the positions indicated. The arcuate segments of each of sections A and B may be considered to be integrally mounted on the same shaft and are rotatable in unison, step by step, to four discrete positions, numbered 1 to 4, as shown in Table G hereinafter. The rotatable segments are of different widths measured radially. The longer of the contacts will make engagement with a portion of a rotatable conducting segment of either width when in radial alignment therewith. The shorter of the contacts will make engagement only with a portion of a segment of greater width when in radial alignment therewith.

Reference to section A of the Loop switch shows that when the switch is in the position indicated on the drawing, which corresponds to the zero position, as shown in Table G, contacts 1 and 10 are interconnected; contacts 2, 4 and 6 are interconnected; and contacts 7 and 9 are interconnected. The other contacts of switch unit A are not interconnected. Reference to switch section B of the Loop switch shows that, with the switch in the same zero position, contacts 2 and 3 are interconnected; contacts 4 and 5 are interconnected; and contacts 9 and 11 are interconnected. The other contacts are not interconnected.

The switch is rotated into the next discrete position, that is into position 1, as shown in Table G hereinafter, by moving the shaft clockwise through a 30-degree angle. In this position in the case of section A, contacts 1, 2 and 11 are interconnected; contacts 5 and 6 are interconnected; and contacts 8 and 9 are interconnected. In the case of section B contacts 3 and 4 are interconnected; contacts 5 and 6 are interconnected and contacts 9 and 11 are interconnected. The contact connections which are established through section A and through section B of the Loop switch when the Loop switch is in each one of its four discrete positions may be understood from the foregoing and are shown in Table G for each of the four positions 0, 1, 2 and 3.

The manner of operation of each of the other six multisection, multicontact switches may be understood from the foregoing. In Fig. 2 four other such switches are shown each having two individual sections, sections A and B. These are designated Apex, Line, OPN1 and OPN2, respectively. In Fig. 3 two more such switches are shown designated L Pad and C Bal each of which has four sections A, B, C and D, respectively. As indicated in Tables A, B and C, respectively, the OPN1, OPN2 and Line switches each have three positions 0, 1 and 2, respectively. Table D shows that the switch designated L Pad has eight positions. designated 0 to 7, and as shown in Table E and F, respectively, the switch designated C Bal and the switch designated Apex each has twelve positions designated 0 to 11.

TABLE A

*OPN1*

| Switch position | Condition | Switch contacts connected | |
|---|---|---|---|
| | | Sec. A | Sec. B |
| 0 | PB | 1-2, 5-6, 9-10 | 1-2, 7-8, 9-10 |
| 1 | PRA | 1-2, 5-6, 9-10 | 1-2, 8-9, 10-11 |
| 2 | PSA | 1-4, 5-8, 9-12 | 1-4, 7-8, 9-10 |

TABLE B

*OPN2*

| Switch position | Condition | Switch contacts connected | |
|---|---|---|---|
| | | Sec. A | Sec. B |
| 0 | DX | 9-10 | 1-12, 3-4, 6-7, 9-10 |
| 1 | PS | 1-2, 9-10 | None |
| 2 | PR | 4-5, 7-8, 9-12 | None |

TABLE C

*Line*

| Switch position | Line wires connected | Interference condition | Switch contacts connected | |
|---|---|---|---|---|
| | | | Sec. A | Sec. B |
| 0 | 1 | Negligible | 2-4, 9-11 | 1-10, 3-5 |
| 1 | 1 | 60 cycles | 2-3-4-5, 11-12 | 1-2-10-11, 4-5-6 |
| 2 | 2 | All longitudinal | 1-2-11, 7-8, 9-10 | 1-2-3-12, 5-7, 8-9 |

TABLE D

*L Pad*

| Switch position | Condition | Switch contacts connected | | | |
|---|---|---|---|---|---|
| | | Sec. A | Sec. B | Sec. C | Sec. D |
| 0 | CX Out 0 | 4-6, 9-10 | 4-6, 9-10 | 6-10 | 6-10 |
| 1 | CX Out 150 | 2-3, 9-11 | 2-3, 9-11 | 6-10 | 6-10 |
| 2 | CX Out 300 | 2-4, 10-11 | 2-4, 10-11 | 6-10 | 6-10 |
| 3 | CX Out 450 | None | None | 6-10 | 6-10 |
| 4 | CX In 0 | 4-6, 9-10 | 4-6, 9-10 | 2-10 | 2-10 |
| 5 | CX In 150 | 2-3, 9-11 | 2-3, 9-11 | 2-10 | 2-10 |
| 6 | CX In 300 | 2-4, 10-11 | 2-4, 10-11 | 2-10 | 2-10 |
| 7 | CX In 450 | None | None | 2-10 | 2-10 |

TABLE E

*C Balance*

| Switch Position | Swtich Contacts Connected | | | |
|---|---|---|---|---|
| | Sec. A | Sec. B | Sec. C | Sec. D |
| 0 | 8-11 | 3-5-7 | 8-11 | 3-5-7 |
| 1 | 8-10 | 3-5-7 | 8-10 | 3-5-7 |
| 2 | 10-11 | 5-7 | 10-11 | 5-7 |
| 3 | 8-10-11 | 5-7 | 8-10-11 | 5-7 |
| 4 | 8-11 | 1-7 | 8-11 | 1-7 |
| 5 | 8-10 | 1-7 | 8-10 | 1-7 |
| 6 | 10-11 | 1-3 | 10-11 | 1-3 |
| 7 | 8-10-11 | 1-3 | 8-10-11 | 1-3 |
| 8 | 8-11 | 1-3-5 | 8-11 | 1-3-5 |
| 9 | 8-10 | 1-3-5 | 8-10 | 1-3-5 |
| 10 | 10-11 | 1-3-5-7 | 10-11 | 1-3-5-7 |
| 11 | 8-10-11 | 1-3-5-7 | 8-10-11 | 1-3-5-7 |

TABLE F

*Apex*

| Switch Position | Condition | Switch Contacts Connected | |
|---|---|---|---|
| | | Sec. A | Sec. B |
| 0 | 0 | 9-10 | 9-10 |
| 1 | 200 | 9-11 | 9-11 |
| 2 | 400 | 9-12 | 9-12 |
| 3 | 600 | 1-9 | 1-9 |
| 4 | 800 | 2-9 | 2-9 |
| 5 | 1,000 | 3-10 | 3-10 |
| 6 | 1,200 | 3-11 | 3-11 |
| 7 | 1,400 | 3-12 | 3-12 |
| 8 | 1,600 | 1-3 | 1-3 |
| 9 | 1,800 | 2-3 | 2-3 |
| 10 | 2,000 | None | None |
| 11 | 2,000 | None | None |

TABLE G

*Loop switch*

| Switch Position | Condition | Switch Contacts Connected | |
|---|---|---|---|
| | | Sec. A | Sec. B |
| 0 | HDX BN | 1-10, 2-4-6, 7-9 | 2-3, 4-5, 9-11 |
| 1 | HDX BR | 1-2-11, 5-6, 8-9 | 3-4, 5-6, 9-11 |
| 2 | FDX BN | 1-12, 4-6 | 2-3, 4-5, 7-9, 11-12 |
| 3 | FDX BR | 1-4, 5-6-7-9 | 1-11, 3-4, 5-6, 8-9 |

The line side of the repeater is identical in each of the arrangements per Fig. 4 and Fig. 8. The line side of the repeater in the arrangement per Fig. 4 comprises the right-hand portion of Fig. 1 and all of Figs. 2 and 3 which corresponds in the arrangement of Fig. 8 to the right-hand portion of Fig. 5 and all of Figs. 6 and 7. The left-hand portion of Fig. 1 shows the so-called local side of the repeater, which in Fig. 1 is arranged as a balanced loop. Correspondingly the left-hand portion of Fig. 5 shows the local side, which in Fig. 5 is arranged as an electronic coupling circuit for connection to a hub repeater system. The type of local circuit to which the line side of the repeater is connected depends upon the method of operation and interconnection employed in an office. Each of the local terminating circuits which can be used with the line side of the repeater is arranged to control the sending relay S in the line side of the repeater in Fig. 1 for transmission of signals and to receive signals from relay R armature. Subject to certain limitations in transmission performance which are to be disclosed later, any of the local terminations can be used with any of the types of transmission or any of the line arrangements provided for in the repeater.

TRANSMISSION OF SIGNALS OVER THE LINE

The following description of transmission over the line is written as though the repeater were operating to another repeater of the same type at the other end of the line, but it is equally applicable when the repeater operates to any other suitable repeater or teletypewriter subscriber set. The total current in each branch of the repeater circuit at each terminal includes components which are supplied by the home or sending battery and other components which are supplied by the batteries at the remote repeater. Operation of the repeater is described herein by considering separately the effects of current components due to the home battery and those due to the remote battery.

Operation of the armature of relay S under control of the local terminating circuit associated with the repeater applies marking or spacing battery conditions to the line through the apex circuit and one winding of relay R. A similar magnetically opposing winding of relay R is connected in a circuit from the apex branch through the line balancing network to ground. When adjusted for duplex balance, the network impedance closely matches that of the line, so that signal currents supplied to the line under control of the armature of local relay S are matched by equal currents in the network branch and relay R is substantially unaffected.

Signal current components in the local repeater due to the battery conditions supplied to the line by relay S in the remote repeater may be called received signal currents. These currents flow through the line winding of relay R and to ground, part through the apex branch including contacts of relay S and part through the balancing network. The line winding and the network winding of relay R are series-aiding with respect to received signal currents and are poled so as to recognize as marking or spacing the current directions corresponding to the position of the armature of relay S in the remote repeater. If the repeater is in duplex balance as described in the last preceding paragraph, relay R will be controlled by the received signal currents while being unaffected by the transmission of outgoing signals. An equalizer consisting of a coil in series with a variable resistance can be connected across the windings of receiving relay R, modifying the current wave shape in the relay so that some forms of signal distortions are reduced. The equalizer is described in detail hereinafter.

Three types of transmission over the line are provided, known as differential duplex, type A polarential and type B polarential. They differ in the battery conditions supplied to the contacts of relay S and in the winding connections of relay R, which in each case must be arranged for proper operation in response to the battery conditions supplied by the remote repeater. Differences in performance relate particularly to the reaction on transmission caused by a change in the line conditions between the present and the remote repeater which impairs the duplex balance. Each type of system is capable of being used with any of the terminating arrangements on the local side or with any of the induction arrangements of the line side, but the characteristics of each system, as described in detail hereinafter, make it best suited to meeting certain operating requirements. Differential duplex operation may be used when the duplex balance can be readjusted, as required, by changing line conditions. If a high degree of balance is maintained, full-duplex operation, or simultaneous operation in both directions can be provided. Polarential transmission is intended for use where the service is half-duplex and freedom from readjustment is desired. The type A system should be used where it is more important to minimize the effects of line resistance changes, and the type B system should be used where it is more important to minimize the effects of line leakage.

The repeater is conditioned for operation as a terminal of a differential duplex or polarential system by operation of switches OPN1 and OPN2 to positions indicated by the tables on the drawing. Switch OPN1 controls the supply of positive and negative 130-volt battery to the contacts of relay S and arranges the windings of relay R so as to recognize either positive or negative battery at the remote repeater as marking. Switch OPN2 controls an alternate supply of ground instead of battery to the marking contacts of relay S and opens or closes the bias current circuit of relay R. Short circuits are applied to the adjustable line pads and apex resistance for terminal conditions which require a zero setting of these controls. The connections provided by the switches OPN1 and OPN2 are described in detail hereinafter.

LINE CONDITIONS

The repeater can be arranged under control of the Line switch for line connections which provide for reducing the adverse effects of different kinds and degrees of line interference. Any of the transmission systems may be used with any of the line arrangements. If the total line interference is relatively small, a single telegraph line circuit, called hereinafter line 1, may be used and the Line switch should be in position 0. The effects of 60-cycle power inductance into a one-wire system may be reduced by a tuned shunt which is connected across the windings of relay R when the Line switch is in position 1. A high degree of protection against 60-cycle or other kinds of line interferences, including that due to earth potentials and telegraph crossfire, may be obtained by the use of a second or neutralizing line. Operation of the line switch to position 2 provides termination in the repeater for a second line called hereinafter line 2, which duplicates the termination of line 1 including two windings of relay R. These windings are connected in line and network branches corresponding to those associated with line 1, but the windings are oppositely poled with respect to currents from the line. Longitudinal interference currents which are equal in the two lines will, therefore, have practically no magnetic effect on relay R. The line arrangements are described in detail hereinafter.

DIFFERENTIAL DUPLEX OPERATION

*"Normal" and "opposite" arrangements of differential duplex systems*

When arranged for differential duplex operation, the repeater transmits a polar signal from positive and negative 130-volt battery supply connected to the contacts of relay S. Either polarity may be used for marking. Negative for marking and positive for spacing is called "battery normal" and the converse is called "battery reverse." The windings of relay R must be poled so as to recognize as marking the polarity which is assigned for this purpose at the remote terminal. The winding arrangement which recognizes a remote negative battery as marking is called the "line normal" condition and the converse arrangement is called the "line reverse" condition. Three combinations of line and battery conditions are provided in the repeater, permitting two types of differential duplex systems to be set up. One system, which may be called the "normal" arrangement, has repeaters at both terminals in the "line normal" and "battery normal" condition. The other system, which may be called the "upset" arrangement has "line normal" and "battery reverse" at one terminal and "line reverse" and "battery normal" at the other terminal. The first arrangement results in approximately 0 total line current when both terminals are transmitting a marking signal. In the "upset" system maximum total line current occurs when both terminals transmit marking signals and approximately 0 total line current occurs when one terminal transmits a space and the other a mark. With this arrangement an intermediate station can be operated on a neutral basis as described hereinafter.

DETAILED DECRIPTION OF TRANSMISSION IN THE "NORMAL" DIFFERENTIAL DUPLEX SYSTEM

When operated as a terminal of a "normal" system, the repeater is arranged for the "line normal"-"battery normal" condition and must be connected over the line to another suitable differential duplex repeater which is also in the "line normal"-"battery normal" condition. Switch OPN1 should be in position 0 and switch OPN2 should be also in position 0. This condition is shown on the drawing. Negative 130-volt battery is connected to the marking contact of relay S through contacts 10—9, section B of switch OPN1 and 9—10 of section A, and positive battery is connected to the spacing contact of relay S through contacts 8—7, section B of switch OPN1. The input signal condition which is to be transmitted over the line is applied to the windings of polar relay S from the local side of the repeater through the balanced loop or the electronic coupling unit. Operation of the armature of relay S in response to the input signal will result in transmitted currents from the local or home battery which will be equal in magnitude but opposite in direction from the marking and spacing signal received from the distant terminal. Component currents furnished by the batteries at the remote terminal of the system will be disregarded temporarily in order to simply the explanation. The transmitted currents furnished by the home batteries flow through inductance coil L1A and through inductance coil L1B in series with resistance R201 which latter are shunted by resistance R202, through the current regulating resistance, made up of resistances R30A to R70A of section A of the apex switch to the junction of resistances R13A and R13B which is the apex point. Inductances L1A, L1B and resistances R201 and R202 constitute a noise killer which modifies the transmitted signal currents so as to reduce interference in the telephone circuits using the same facilities. Resistance R101, which is connected in series with capacitance C101 and resistance R102 which is connected in series with capacitance C102, shunt the armature and contacts of relay S and form wave-shaping and contact protective networks for relay S and also protect those contacts of switch OPN1 which control the battery supply leads to the relay contacts.

At the apex point, the transmitted signal currents divide, part flowing through winding C of the receiving polar relay R and the remainder through winding D. Winding C is connected through contacts 10—9, section A of switch OPN1, contacts 1—12, section B of switch OPN2, which short-circuit line pad resistors R20A and R20B and through resistor R22A and resistor R22B and the top break contact of jack Line, both in parallel with resistor R22A, to conductor Line 1, which extends to the remote repeater. Measurement of the total line current can be made in the Line jack. Winding D of relay R is connected through contacts 6—5, section A of switch OPN1 through contacts 4—6 of section A of the L Pad switch, to the line balancing network of the repeater which is described hereinafter. When the repeater has been adjusted for duplex balance, as described hereinafter, the impedance of the branch circuit from the apex point through winding D and the balancing network to ground closely matches the impedance of the branch through the line winding C, the line, and the remote repeater to ground. The relay windings in the line and network branches are magnetically balanced and oppositely poled with respect to currents to or from the apex point so that the transmitted signal currents, described in the foregoing, will divide equally between the two branches and will have approximately no effect on relay R, thus the transmitted signals will produce no current flow in the 80-ohm resistor R14 bridged between the line and network branches at the end of the 44-ohm resistances R13A and R13B. A meter connected in jack Bal1 in series with resistance R14 can be used to indicate the adjustment of the network to obtain duplex balance since when the network impedance closely matches that of the line, operation of relay S will have no effect on the meter. If the duplex balance is adequately maintained, relay R will be solely responsive to signals received from the distant repeater, so that simultaneous transmission in both directions, or full-duplex service, can be provided if the local circuits of the repeater are arranged for this type of service.

Signals received by the repeater from the line originate at the distant repeater in a manner similar to that described above. The current components furnished by the distant batteries will now be considered separately, disregarding the components furnished by the home batteries which have no effect on relay R when the repeater is in duplex balance. The signal currents received from the line will be in opposite directions but of equal magnitude for a marking or spacing condition being transmitted by the distant repeater. The received line currents flow through winding C of relay R, dividing in the 44—44—80-ohm delta, formed by resistances R13A, R13B and R14, adjoining the apex point of the repeater, part flowing through the apex branch including the contacts of relay S to ground, and part flowing through winding D of relay R and the balancing network to ground. The received current flowing in the network branch is magnetically aiding with respect to that in the line branch, and the windings are so poled that when relay S of the distant repeater is on its marking contact, the armature of relay R, shown in Fig. 1, will be operated to engage its marking contact. The effect of that part of the received current which flows to ground through the apex branch can be considered in terms of the voltage drop it causes in the apex impedance. This voltage drop applied between the apex point and ground produces no magnetic effect on relay R for the same reason that the home battery potential applied to the apex point has no effect as discussed in the foregoing. Adjustment of the apex resistance can, therefore, be used as a means of controlling the transmitted signal currents without changing the ampere-turn strength of the received signal, which will remain constant at the value it would have if the apex impedance were zero. Also, the current in resistor R14, bridged between the line and network branches, will be independent of the impedance in the apex branch. This bridge current, which is due solely to the batteries at the remote terminal when the repeater is in duplex balance is directionally proportional to the ampere-turn strength of the received signal.

The received signal current is converted into the local output signal by the operation of the armature of relay R to its marking or spacing contact. This applies positive or negative battery to the local circuits through the electronic coupling unit or through the balanced loop circuit associated with the repeater, the effect of which will be described in detail hereinafter. Proper polarity for the marking and spacing contacts of relay R to insure recognition of received marking and spacing signals in the associated local circuits is provided when the conditions of local terminations are set up. Resistor R121 and condenser C3 and resistor R122 and condenser C4 form signal-shaping and contact protective networks for the receiving relay R. These networks also protect the contacts of the switches in the associated balanced loop circuit which are in series with the battery supply loops to the contacts of the R relay.

In practice the total line current in the normal system may not be reduced to zero when batteries of the same polarity are connected through the apex branch to the line at both terminals. The small line current which may remain is called "over-ride" current. It may result from unequal battery voltages or unequal apex resistance at the terminals or from line leakage. Over-ride current has no effect on transmission if the repeaters at both terminals are in duplex balance.

Imperfect duplex balance of the repeater will result in unequal division of the transmitted currents between the line and network branches and relay R will be subject to disturbance by the transmitted signal conditions. If transmission takes place in only one direction at a time, which is the case in half-duplex operation, resistance unbalance between the line and network will cause bias. A change which results in lower resistance in the line, such as would be caused by line leakage to ground, will tend to produce spacing bias in the received signals. If transmission takes place simultaneously with reception, which is the case in full-duplex operation, inequality in the transient line and network currents will produce additional distortion in the received signals.

DETAILED DESCRIPTION OF TRANSMISSION IN THE "UPSET" DIFFERENTIAL DUPLEX SYSTEM

Figures 1, 4:
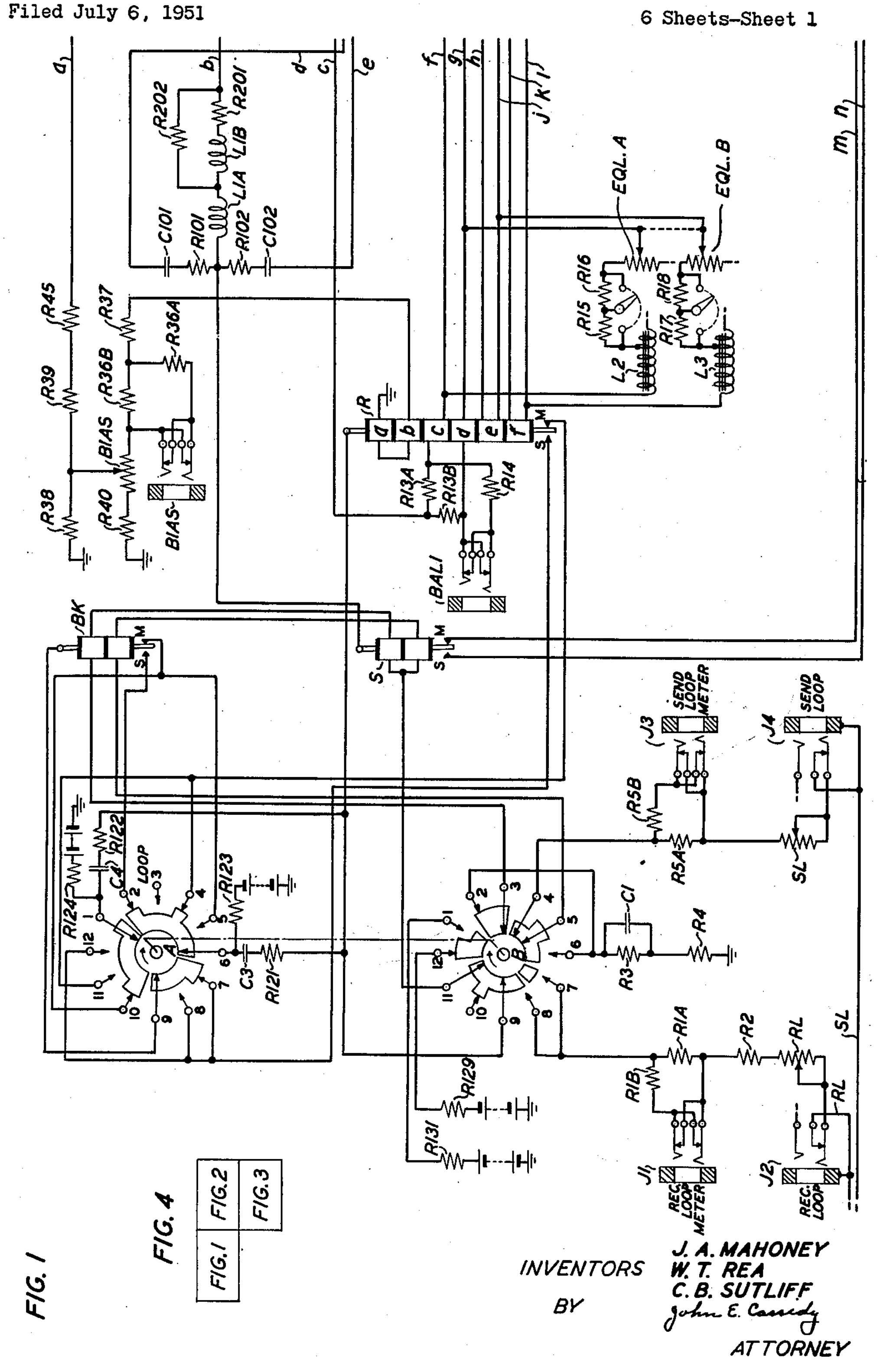

At the "line normal"-"battery reserved" terminal of an "upset" differential duplex system, switch OPN1 is operated to position 1 and switch OPN2 is operated to the position 0. The switches at the distant repeater are in the line normal battery normal position. Positive 130-volt battery is supplied to the marking contact of relay S through contacts 8—9, section B of switch OPN1, and contacts 9—10, section A of switch OPN2. Negative 130-volt battery is supplied to the spacing contact of relay S through contacts 10—11, section B of switch OPN1. Otherwise the repeater is identical with the condition described for the terminal of a "normal" system. Transmission of signals to the line is accomplished in the same manner as described for a normal differential duplex system, but the signal currents for transmitted marking and spacing conditions are reversed in direction as compared to those transmitted by the "normal" terminal. Relay R is not affected by the transmitted currents if the repeater is in duplex balance, as in the case of the normal repeater. Reception of signals by the "line normal"-"battery reversed" repeater is accomplished in the same manner as described under the normal system, since the received signal currents have the same relative directions for marking and spacing signals, and relay R windings are poled in the same direction as for the normal repeater.

At the "line reversed"-"battery normal" terminal of an "upset" differential duplex system, switch OPN1 is operated to position 2 and switch OPN2 is operated to position 0. The switches at the distant repeater are in the line normal battery normal position. Terminal 1 of relay R is connected to the network branch of the repeater through contacts 5—8, section A of switch OPN1. Terminal 6 of relay R is connected to the line branch of the repeater through contacts 9—12, section A switch OPN1. Windings 1—2 and 3—6 are thus interchanged between the line and network branches as compared to the "normal" repeater described heretofore. Battery connections and transmission of signals to the line are the same as for normal operation. The reversed line and network windings of the relay R are mutually opposing with respect to the transmitted signal currents, and the relay is unaffected if the repeater is in duplex balance. Received signal currents flow in opposite directions for each signal condition as compared to those received from a "normal" repeater, and therefore are properly recognized by the reversed relay windings, causing relay R to follow the armature of remote relay S.

An intermediate station in an "upset" system can be operated on a neutral basis, providing half-duplex three-way service. The intermediate receiver follows the line current, which is at maximum value when both terminals are transmitting marking signals, falling to approximately zero when one of the terminals transmits a spacing signal. A spacing signal is transmitted at the intermediate station by opening the line, allowing the network branch current at each terminal to operate relay R to spacing.

A differential duplex terminal station either "line normal"-"battery reversed" or "line reversed"-"battery normal" and a neutral terminal station may be operated on an "upset" duplex basis provided the neutral terminal supplies battery of opposite polarity to the marking battery at the differential duplex repeater.

DETAILED DESCRIPTION OF THE NETWORK BRANCH OF THE REPEATER

The network branch of the repeater provides for duplex balance of the repeater when used with any of the line facilities. Apparatus units in the line branch of the repeater close to the "apex" point are duplicated in the network branch. The line facility is simulated by an adjustable line balancing network. In the paragraphs below the line and network branches are compared in detail.

Beginning at the "apex" point, one 44-ohm resistor R13A and winding *c* of relay R are matched by the 44-ohm resistor R13B and winding *d* of relay R. Either of these windings may be in the line branch, and the other in the network branch, depending on the position to which switch OPN1 is operated. When the "line normal" connection of relay R windings is required, switch OPN1 is operated to position 0 or position 1. Winding *c* of the R relay is connected through line pad resistor R20 and resistor R22A to the line. Winding *d* of relay R is connected through pad resistors R24A and R24B to the balancing network. When the "line reversed" connection of relay windings is required, switch OPN1 is operated to position 2, interchanging the connection of relay terminals 1 and 6 described above. In either case the balanced relay windings are mutually opposing with respect to currents to or from the apex branch, and if the remainder of the line branch is closely matched by the remainder of the network branch, relay R will be substantially unaffected by any voltage in the apex branch. Bridged elements connected between the line and network branches of the repeater include 80-ohm resistor R14, the equalizing shunt formed by coil L2, resistors R15 and R16 and variable resistance EQLA, and if Line switch is in position 1, a selective 60-cycle shunt which is described hereinafter. When the line and network branches are otherwise in balance, these bridged elements connect points of equal potential with respect to any voltage in the apex branch, and hence have no current components due to the home batteries and no effect on the duplex balance.

Pad resistors R20A and R20B in the line branch are matched by resistors R24A and R24B in the network branch. For differential duplex operation both sets of these pads are short-circuited by contacts on section B of switch OPN2 which is in position 0. For polarential operation, described hereinafter, the short-circuits are removed by operation of switch OPN2 to either position 1 or 2. The pads can then be adjusted in 150-ohm steps from 0 to 450 ohms under control of the L Pad switch. Similar wiring is provided from resistors R20A and R20B and R24A and R24B to contacts on section A of the switch L Pad so that equal values of resistance are inserted in the line and network branches for each position of the switch. The four positions of the L Pad switch for 0, 150, 300 and 450 ohms resistance are duplicated in left-hand and right-hand sectors, the alternate sectors being used for switching of the composite set balancing apparatus, as described below.

From the line pad resistors R20A and R20B the line branch of the repeater is extended through resistors R22A and R22B, thence through the line equipment in the office to the line facility. If the line is equipped with composite sets, these can be simulated in the network branch by coil L4 connected in series and capacitors C5 and C6 connected in shunt to ground. These connections are controlled by section C of switch L Pad. When the switch is set at any of the first four positions for different values of line and network pad resistance, designated CX Bal Out, coil L4 is short-circuited and the lead to capacitors C5 and C6 is opened. When the switch is set at any of the succeeding four positions, designated CX Bal In, the short circuit is removed from coil L4 and the shunt capacitance is connected.

The line balancing portion of the network branch includes also a resistance branch and a "timing" branch which consists of series resistance and capacitance. The adjustable "resistance" branch provides for balancing the line with respect to direct currents. It consists of resistor R26 in series with the 0–3500-ohm section of balancing resistance rheostat BRA, connected from coil L4 to ground. The adjustable "timing" branch provides for approximate balance of the line with respect to transient currents. It consists of the 0–1500-ohm section of the rheostat TRA in series with a 0–11-microfarad capacitance controlled by the switch C Bal and is connected in parallel with the "resistance" branch. The variable capacitance is made up of one 1-microfarad C8, one 2-microfarad C7, and two 4-microfarad C9 and C10 condensers, connected in parallel as required. As switch C Bal is rotated, connections are made through sections A to 0, 1, 2, and 3-microfarad capacitances in the successive positions, the cycle repeating every four positions. Section B adds 0-microfarad in the first 3-microfarad cycle, 4-microfarad in the second, 8-microfarad in the third, thus providing 1-microfarad steps from 0 to 11 microfarads in accordance with the designated positions of the switch. A small resistor is connected in series with each of the unit capacitors to protect the switch contacts from excessive initial currents as capacitors are connected in parallel. These resistors have values inversely proportional to the capacitance in each case, so that smooth adjustment of the timing branch is not impaired. The resistor and capacitance arrangement, and the two functions performed by the resistor are important features of the invention.

RECEIVING EQUALIZER

The present line repeater includes an improved equalizer which is one of the important features of the invention. This equalizer is in the form of a receiving shunt, including coil L2 and the 0–1000-ohm section of tandem rheostat EQLA which is connected across the line side of receiving relay windings *c* and *d*. This shunt is closed when the rheostat is moved away from the off position. Small resistors R15 and R16 are for padding out the resistance of the coil when necessary, as described hereinafter. If the repeater is otherwise in duplex balance the adjustment of the shunt has no effect on transmitted currents or on the duplex balance of the home repeater. It shunts the receiving relay in a manner which in ampere turn effect is the same as though the "apex" point were grounded and connected to the mid-impedance point of the shunt and to the mid-point of the 80-ohm bridge R14.

Because the shunt has considerably more inductance than the relay windings, it by-passes a relatively larger portion of the low frequency and direct-current components of the received signal around the relay, the degree of discrimination increasing as the resistance is decreased by clockwise rotation of the rheostat. The operating wave received by the relay is modified in such a way as to tend to reduce negative characteristic distortion. This form of distortion ordinarily becomes important in relatively low speed transmission, such as in 60-speed transmission only when the line conditions are especially severe or when the input signals are already distorted. Benefits to be obtained from the equalizer are therefore in the form of increased distortion tolerance rather than improvement in normal operation with input signals of low distortion. At speeds of 75 words per minute, improvement in distortion tolerance is greater, and there may be some reduction in the distortion when the input signals are relatively undistorted.

TYPE A POLARENTIAL OPERATION

*Different terminal conditions required for type A polarential systems*

In the type A polarential system polar transmission is used in one direction and differential transmission in the other direction. Complementary arrangements of the repeaters at the two terminals are required, one being arranged for polar sending and differential receiving, the other for differential sending and polar receiving. These repeaters will be referred to hereinafter as the polar sending and polar receiving repeaters, respectively. Proper battery and line connections in each repeater are set up under control of the switches OPN1 and OPN2. The system provides half-duplex service, and is relatively unaffected by changes in line resistance. It is intended primarily for use on cable circuits.

*Transmission from the type A polar sending to the type A polar receiving repeater*

At the polar sending terminal of a type A system switch OPN1 is operated to position 2 and switch OPN2 is operated to the position 1. Transmission of input signals to the line is accomplished by the operation of the armature of relay S under control of the coupling unit or balanced loop connected to the local side of the repeater. Negative 130-volt battery is connected to the marking contact of the S relay through contacts 10—9, section B of switch OPN1, and contacts 10—9, section A of switch OPN2. Positive 130-volt battery is connnected to the spacing contact of relay S through contacts 8—7, section B of switch OPN1. Sending battery polarities are thus the same as the "battery normal" arrangement of a differential duplex repeater. Polar signal currents, of equal value but in opposite directions for transmitted marking and spacing conditions, flow through the noise killer, the apex resistance, and divide between the line branch and network branch of the repeater. Details of the apex branch are as described for normal differential duplex operation. The line branch of the repeater includes winding *d* of relay R, which is connected through terminals 12—9, section A, switch OPN1, through line pad resistors R20A and R20B and R22A and R22B to the line. Series resistance in 150-ohm steps may be inserted by means of the sections of resistor R20 which are controlled by section A of switch L Pad. Measurements of total line current can be made in the line jack, the sections of resistor R22 being so proportioned that a direct reading in milliamperes is obtained with the meter of a cooperating test set, not shown. If the repeater is in duplex balance, windings of relay R in the line and network branches will have equal currents of opposing magnetic influence due to either of the transmitted signal conditions. Relay R will therefore be substantially unaffected by the transmitted signal condition. Current components in the repeater which are due to the battery at the remote polar receiving repeater are disregarded at this time in order to simplify the explanation.

At the polar receiving repeater of a polarential type A system, switch OPN1 is operated to position 1 and switch OPN2 is operated to position 2. Winding *c* of relay R is connected in the line branch through contacts 10—9, section A, switch OPN1 which is operated to position 1. Resistance pads R20A and R20B and meter resistors R22A and R22B are connected between the line and the relay winding, as in the polar sending repeater. Winding *d* of relay R is connected between the apex and the line balancing network through contacts 6—5, section A, switch OPN1. This arrangement of relay windings is the same as the "line normal" condition for differential duplex repeaters. Polar signal currents which originated at the polar sending terminal, as described under the present heading, are received at the polar receiving repeater, flowing through the line winding *c* of relay R and to ground through parallel paths, consisting of the apex circuit and the network branch. The armature of relay S is connected to ground through its marking contact. Only a small portion of the received current flows through the network branch because of the relatively low resistance in the apex branch, as described later. If the polar receiving repeater is in duplex balance its receiving relay R is unaffected by the signal condition applied to the apex by its relay S armature. Relay R windings are so poled with respect to the received signal currents that the relay will follow the position of the relay S armature in the remote polar sending repeater. If the polar receiving repeater is not in duplex balance relay R is not affected while the local relay S armature is on the marking contact, which is connected to ground, because there are no line and network currents contributed from this source. When the relay S is on the spacing contact, which is connected to negative battery, bias or other distortions in the received signals will result from duplex unbalance, as in the case of a differential duplex repeater. If half-duplex service, or transmission in only one direction at a time is provided, relay S will normally be in the marking position when signals are being received from the remote polar sending repeater so that true polar transmission will be realized, with no bias resulting from line changes.

Receiving equalizers are provided for use at type A polarential polar receiving terminals when required to reduce the characteristic distortion in the received signals. The description and functioning of the equalizer are the same as for the differential duplex repeater, as covered under heading "Receiving Equalizer" hereinbefore.

*Transmission from the type A polar receiving to the type A polar sending repeater*

Transmission from the polar receiving terminal to the line is accomplished by operation of relay S under control of the coupling unit or balanced loop associated with the repeater. Ground is connected to the marking contact of relay S through the R19 resistance, contacts 9—12, section A of switch OPN2 and negative 130-volt battery is connected to the spacing contact of relay S through contacts 10—11, section B of switch OPN1. In order to facilitate later explanation of signal reception at the polar sending terminal, and the self-compensating feature of the system, it will be considered that the battery conditions just mentioned are made up of a steady component of negative 65 volts, which is the average of the marking and spacing conditions, plus a polar component of positive 65 volts for marking and negative 65 volts for spacing. For reasons which are made evident below, the steady negative 65-volt component may be called the "compensating component" of the applied voltage, and the 65-volt polar component may be called the "signaling component" of the applied voltage. The signaling component agrees in polarity with the "battery reversed" differential duplex repeater, but is of only half the magnitude. Compensating current components and polar signal current components, corresponding to the respective voltages, are transmitted through the apex circuit, dividing between the line and network branches without influencing the receiving relay because of duplex balance. The adjustable resistance in the apex circuit, consisting of resistors R30A to R70A controlled by the section A of switch Apex, is short-circuited through contacts 4—5, section A, switch OPN2. Otherwise the apex branch is as described for normal differential duplex hereinbefore.

The receiving relay R at the polar sending terminal is connected in the "line reversed" manner, as stated under the last preceding heading. Current components due to the positive and negative 65-volt polar voltage component applied by the relay S armature in the remote polar receiving repeater will therefore influence relay R in accordance with the signal condition being transmitted. The compensating current component due to the steady negative 65-volt component of the voltage supplied by the distant repeater will have a spacing influence, which will be of the same magnitude as the effect produced by either polarity of the polar signal voltage. Biasing current in a marking direction is supplied to windings *a* and *b* of relay R, at the polar sending repeater, from positive 130-volt battery, through contacts 1—2, section A of switch OPN2, a fixed voltage-reducing potentiometer comprising resistors R45, R39 and R38 and a variable potentiometer including resistors R40, R36B, R36A, R37 and the Bias rheostat. This circuit has the characteristic of providing approximately constant fineness of control throughout the range of currents required and is another important aspect of the invention. The value of the biasing current is adjusted, utilizing circuit relations described below, so as to just annul the spacing influence of the compensating current component received from the remote polar receiving repeater. Current components from the home battery will have no influence on relay R at the polar sending repeater so long as the repeater is in duplex balance, so that under the conditions described relay R at the polar sending repeater will be solely responsive to the polar signal components of the currents transmitted by the distant polar receiving repeater.

Adjustment of relay R biasing current at the polar sending terminal is based on comparative measurements of the bridge current jack Bal 1 in series with resistor R14 connected between the line and network branches, and the current through jack Bias in the bias current circuit. If the repeater is in duplex balance there is no current component in bridge resistor R14 due to the home battery, regardless of its voltage or the impedance in series with the apex. The total current in the bridge, in the absence of line interference, is furnished by the remote battery and includes a steady and a polar component. The ampere turn effects in relay R due to the steady and polar components of the received signal currents are proportional to the total bridge current. The total bridge current will ordinarily be zero when the remote relay S is transmitting a mark, since the steady and polar components are of equal value and in opposite directions. When the remote relay S is transmitting a space the sum of the ampere turns in relay R, due to the polar and steady components of the received currents, or twice the ampere turns due to the steady component, will be proportional to the bridge current. The biasing ampere turns can be made to annul the steady or compensating ampere turns when the bias current is adjusted to a value relative to the bridge current which takes account of the ratio of turns in relay R line and biasing windings, the current dividing ratio between the 44-ohm resistance in series with the line winding of relay R and the bridge circuit, considering the apex point to be grounded, and the 2 to 1 ratio just mentioned between the total and the compensating ampere turns in relay R during reception of a spacing signal. Resistors R36B and R36A in the biasing circuit provides such shunt and series resistance for a particular test set meter, plugged into jack Bias, that the bias current will have the required relation to the bridge current when the bias potentiometer is adjusted so that the meter reading obtained in jack Bias is the same as that received in jack Bal 1 during reception of a space. Adjustment of the biasing current on a steady state basis as described above is only an approximation. Final adjustment should be made on the basis of minimum received distortion as indicated by transmission measurements, thus providing for a mop-up of distortion due to apparatus variations, circuit characteristics and inaccuracies in meter readings or control settings.

The self-compensating action which is provided to minimize the effect of changes in line resistance on transmission in the differential direction, that is, from the polar receiving to the polar sending terminals, can be explained by considering separately the various voltages which are operating in the system. The polar current components due to the signaling voltage transmitted from the polar receiving terminal will be modified by any change in the line, but since marking and spacing signal currents are affected in the same degree, no bias will be caused in the signals received at the polar sending repeater. Assuming that half-duplex transmission is being provided, relay S of the polar sending repeater will rest on the marking contact while signals are being received by relay R of that repeater. Negative battery potential from the home battery of the polar sending repeater will be applied through the apex circuit, producing current components in the line winding *d* of relay R which have a marking influence and current components in the network winding *c* which have a spacing influence. Under the conditions of duplex balance these currents are equal and the resultant magnetic effect is zero, as discussed previously, but if the line resistance increases from the condition of initial adjustment the network current will over-balance the line current and a spacing influence will be developed, tending to produce bias in the received signals. The increase in line resistance will also cause a decrease in the compensating component of the current transmitted by the distant repeater. Since this component has a spacing influence, a decrease in value will be in the marking direction to compensate for the spacing effect in relay R due to duplex unbalance. Conversely, if the line resistance had decreased, the duplex unbalance would produce a marking influence in relay R and the increase in the spacing compensating current would tend to counterbalance this effect, limiting the bias which may develop to a small amount.

Exact compensation for changes in line resistance will be obtained only when the steady negative marking voltage at the polar sending terminal is reduced in the potentiometer formed by the apex and network branches, to such a value that the sum of the line current components in the marking condition due to this voltage and the compensating voltage at the polar receiving terminal is zero. Practical adjustment of the type A polarential system is based on uniform total line current, in the interests of simplicity. Line pads are inserted in the shorter lines in order to obtain qualitative agreement with the conditions for best self-compensation, as mentioned above. On the longer lines the polar sending apex resistance is less than the value required for best self-compensation, and it may be desirable in some cases to increase this resistance at the expense of line current. If the apex of the polar sending repeater is adjusted to the exact value for perfect compensation, as described above, and there is no line leakage, transmission of signals from either terminal will result in equal values and opposite directions of total line current when marking and spacing signals are transmitted. This does not correspond to equal ampere turn strengths of the signals in the two directions, because of the characteristics of the receiving circuit heretofore described, but it is a desirable condition since equal flux densities are produced in line apparatus for the two signal conditions.

The self-compensating action described above is dependent on relay S at the polar sending terminal remaining operated to its marking contact, and is therefore of benefit only when half-duplex service is being furnished. If relay S of the polar sending repeater is operated to its spacing contact while signals are being received from the line the effects of any duplex unbalance caused by a change in line resistance will be exaggerated instead of compensated for by the steady compensating voltage component at the polar receiving terminal. Distortion in the signals received by relay R will therefore be greater than in the case of a differential duplex repeater with the same degree of unbalance. This will be of no practical consequence in half-duplex service unless the effect on relay R is large enough to impair the operation of the "break" or "double-space bypass" features provided by the associated balanced loop or coupling unit, or unless false operation of relay R, or "kick-off" occurs during normal transmission of outgoing signals. If the duplex unbalance is due to line leakage, its effect will be exaggerated by the compensating voltage component when relay S at the polar sending terminal is on its marking contact, which is the normal condition during transmission in the differential direction. For this reason, type A polarential operation is unsuited to lines subject to appreciable leakage.

Receiving equalizers, heretofore described, are provided for use at type A polarential polar sending terminals when required to reduce the characteristic distortion in the received signals. The functioning of the equalizer as regards modification of the received signal is the same as in the differential duplex case. There is an additional effect at the polar sending terminal of the polarential system, because of the reduction in the steady or compensating ampere turns in relay R. This reduction is determined by the relative resistance of the parallel direct-current paths through the equalizer and the relay windings. Each value of the equalizer resistance therefore results in a different value of the bias current required to annul the steady or compensating ampere turns. However, the relation between the bias current and the current through jack Bal 1 remains the same as described above, regardless of the equalizer adjustment, provided that the repeater is in duplex balance.

TYPE B POLARENTIAL OPERATION

*Different terminal conditions required for type B polarential systems*

Type B polarential systems, like the type A systems, employ polar transmission in one direction and differential transmission in the other. Complementary arrangements of the repeaters at the two terminals are required, one being designated as the polar sending repeater and the other as the polar receiving repeater. Battery and line connections in each repeater are set up under control of switches OPN1 and OPN2. The system provides half-duplex service and has the characteristic of being affected to a relatively small degree by line leakage. It is intended primarily for use on open-wire lines.

*Transmission from the type B polar sending to the type B polar receiving repeater*

At the polar sending terminal of a type B system, switch OPN1 is operated to position 0 and switch OPN2 is operated to position 1. Battery connections to the relay S contacts and the connection of relay R windings in the line and network branches are completed in the "normal" manner as described in detail for the terminal of a "normal" differential duplex system. Biasing current in a marking direction is supplied to windings *a* and *b*, of relay R from positive 130-volt battery, through contacts 1—2, section A of switch OPN2 to the voltage-reducing potentiometer circuit previously described. Operation of relay S armature in response to the input signals will result in the transmission of polar signal currents through the apex and the line and network branches in the same manner as in the differential duplex system. Likewise, relay R will be relatively unaffected if the repeater is in duplex balance. Line pad resistors R20A and R20B are connected in series with the line branch, permitting various amounts of resistance to be inserted under control of switch L Pad as previously described for the polar sending terminal of a type A polarential system. Otherwise, the detailed description of the apex and line branches of the repeater is the same as for the differential duplex terminal. The network branch is also the same as heretofore described.

At the polar receiving terminal of a type B polarential system, switch OPN1 is operated to position 0 and switch OPN2 is operated to position 2. Windings c and d of relay R are connected in the "normal" manner as described for differential duplex operation, this also being the same as the relay winding connections at the type A polar receiving terminal. Polar signal currents received from the remote polar sending repeater, which has "normal" battery connections, will therefore result in proper operation of relay R. The detailed description of signal reception at the type A polar receiving terminal, is applicable to the type B polar receiving terminal except that distortion due to duplex unbalance when the local relay S armature is on its spacing contact will be opposite in sign to that which would result from similar unbalance in a type A polar receiving terminal. This follows from the supply of positive instead of negative battery to the spacing contact of relay S as described below.

Receiving equalizers are provided for use at type B polarential polar receiving terminals when required to reduce the distortion in the received signals. The description and functioning of the equalizer is the same as for the differential duplex repeater.

*Transmission from the type B polar receiving to the type B polar sending repeater*

In the type B polar receiving repeater ground is connected to the marking contact of relay S through contacts 12—9, section A of switch OPN2, and positive 130-volt battery is connected to the marking contact of relay S through contacts 7—8, section B of switch OPN1. As in the case of the polar receiving type A repeater, these battery conditions will be considered as being made up of a steady component equal to the average of the marking and spacing conditions and a polar signaling component. The steady, or compensating component, is positive 65 volts and the polar component is negative 65 volts for marking and positive 65 volts for spacing, these being opposite in polarity to the voltage components at the type A polar receiving terminal. The signaling component agrees in polarity with the "normal" battery arrangement of the differential duplex repeater, but is of only half the magnitude. When the relay S is operated under control of the input signal condition in the local terminating circuit, steady and polar current components due to the respective voltage components are transmitted through the apex branch, dividing between the line and network branches without affecting the receiving relay so long as the repeater is in duplex balance. The variable apex resistance is short-circuited and the variable line pad is not short-circuited, as in the type A polar receiving terminal.

Relay R windings at the type B polar sending terminal are connected in the "normal" manner, as mentioned above, and therefore relay R will be influenced in the proper direction by the polar component of the current received from the remote polar receiving repeater. The compensating component of the received current will have a steady spacing influence, which will be annulled by the marking effect of the locally supplied bias current. Details of the bias current supply circuit and the method of adjustment are the same as in the type A polar sending repeater. When the repeater is properly adjusted the home battery has no effect on relay R because of duplex balance, so that relay R will be solely responsive to the polar signal components of the currents received from the distant repeater.

The self-compensating action which minimizes the effect of line leakage on transmission in the differential direction can be explained by considering separately the various voltages operating in the system. Marking and spacing currents due to the polar signaling component of the voltage at the polar receiving terminal will be similarly affected by line leakage, and no bias will be caused in the signals received at the polar sending terminal. Assuming that half-duplex service is being provided, relay S of the polar sending repeater will normally be in the marking position while signals are being received by relay R of that repeater. Current components supplied by the negative home battery at the polar sending repeater will have a spacing influence in line winding *c* and a marking influence in network winding *d*, the resultant effect being zero when the repeater is in duplex balance. If leakage occurs on the line additional to that which was present at the time duplex balance was adjusted, the line branch current from the home battery will over-balance the network branch current and relay R will be influenced in a spacing direction. However, the added line leakage will reduce the steady spacing current component supplied by the compensating voltage from the remote repeater, thus tending to compensate for the spacing effect, caused by duplex unbalance. Conversely, a decrease in line leakage, compared to the condition prevailing when initial adjustment was made, will result in a marking influence due to duplex unbalance, and an increased spacing effect due to increase in the received compensating current component, thus limiting the bias which may develop to a small amount.

Exact compensation for a single concentrated leak to ground at any point on the line will be obtained when the apex resistance at the polar sending terminal is adjusted so that the steady potential to ground at the point of application of the leak is zero. The steady potential to ground is the potential due to the negative home battery and the positive compensating voltage component at the remote polar receiving terminal. That point on the line at which the steady voltage to ground is zero may be called the "compensation point," because a concentrated leak of any value at that point will cause no bias. In practice the leakage may be distributed over part or all of the line, so that in general perfect self-compensation will not be obtained. Best average performance will be obtained if the system is adjusted when there is no leakage on the line so that the compensation point is located about one-third of the total length of the line (or that portion subject to leakage), away from the polar sending terminal. This results in practically complete compensation for uniformly distributed leakage covering the entire line and approximately equal maximum values of spacing and marking bias for leakage between the compensation point and the polar sending or polar receiving terminals, respectively. Adjustment of the polar sending apex resistance is designed to fix the compensation point approximately in accordance with the requirements mentioned above. In order to obtain this condition on the shorter lines it is necessary that the line current be limited by the line pads, instead of by the apex resistance. Longer lines require higher values of apex resistance in order to properly fix the compensation point, but this reacts unfavorably on the line current, thus limiting the resistance of the line over which type B operation can be used.

Best performance can be obtained from type B polarential systems by modifying the initial adjustment of self-compensation as experience indicates the need. This is particularly true if initial line-up was made during the presence of line leakage. As mentioned, leakage near the polar sending terminal tends to cause spacing bias in the signals transmitted in the differential direction, while leakage near the other end of the line causes marking bias. A system lined up during either of these conditions is subject to the widest possible swing in line conditions. The self-compensating action will tend to reduce the bias which may occur, but this will be greater than if the system had been lined up during a more nearly average condition of the line. Either a line with no leakage, or a line with uniformly distributed leakage over its entire length can be taken as the median condition. The system can be adjusted under either line condition with nearly identical results as regards the maximum amount of bias which may develop because of non-uniform leakage on the line. It is more practical, however, to determine when the line is free from leakage than to determine when the leakage is uniform or normal. It is preferable therefore to make the final adjustments of the system when the line is dry or free from leakage. The distribution of leakage which occurs during wet weather conditions on a particular system may be such that a predominance of bias of one sign will be experienced. If there is a predominance of marking bias, it indicates that the effect of duplex unbalance is smaller than the change in the compensating component of the received signal currents. Improvement can be made by decreasing the apex resistance, thus increasing the effect of the existing unbalance without changing the effective strength of the steady and polar signal components received from the polar receiving terminal. Conversely, a tendency toward spacing bias may be corrected by an increase in the apex resistance.

When transmission is in the differential direction, the total line current is in the same direction for both signal conditions, but roughly 2½ times greater during the transmission of a spacing signal. The relatively large and unequal flux densities which may result in magnetic apparatus may contribute to distortion in the system, but these effects are more or less mopped up by the adjustments which are provided for obtaining minimum total distortion.

As in the case of the type A polarential system, the self-compensating feature is dependent on relay S at the polar sending terminal remaining on its marking contact, and is therefore effective only when half-duplex service is being furnished. If relay S is operated to its spacing contact while signals are being received, the effects of duplex unbalance due to line leakage will be exaggerated instead of compensated for by the change in the steady component of the received current. Distortion in the signals received by relay R will therefore be greater than in a differential duplex repeater with the same degree of unbalance. This will be of no practical consequence in half-duplex service unless the effect on relay R is large enough to impair the operation of the "break" or "double-space bypass" features provided by the associated balanced loop applique or coupling unit, or unless false operation of relay R, or "kick-off" occurs during normal transmission of outgoing signals. If the duplex unbalance is due to a change in series resistance of the line, its effect will be exaggerated when relay S armature is on its marking contact, that is, in the normal condition during transmission in the differential direction. Because of this characteristic of the type B system, it is best suited for use on lines on which the greatest changes are those due to line leakage.

Receiving equalizers are provided for use at type B polarential polar sending terminals when required to reduce the characteristic distortion in the received signals. The description and functioning of the equalizer as regards modification of the received signal is the same as covered for differential duplex operation. An additional effect at the polar sending terminal makes the required value of bias current dependent upon the equalizer setting, as described for type A polarential operation.

DESCRIPTION OF PROVISIONS FOR DIFFERENT LINE ARRANGEMENTS

Adaptation of the repeater to various line arrangements is controlled by the Line switch. The line arrangements are related to the amount and kind of line interference, and are largely independent of the type of transmission employed.

*One-wire operation*

For operation over a single telegraph line circuit with a low level of interference, the Line switch should be set in position 0. Relay windings *e* and *f* employed in the termination of the No. 2 or neutralizing line as described below, are opened at contacts 7 and 10, section A of switch Line, so that even if a second line were connected to Line 2 of the repeater, no complete circuit through the relay windings would be provided. Miscellaneous interconnections occur among the apparatus units employed in the No. 2 apex circuit or the 60-cycle shunt, but there is no complete circuit which affects the operation of the repeater.

*One-wire operation with 60-cycle receiving shunt*

Substantial reduction in the distortion due to 60-cycle interference in one-wire systems can be obtained when the switch Line is operated to the position 1. This connects a tuned shunt across relay R windings, by-passing a large portion of the interference currents around the relay. Windings *e* and *f* of relay R are disconnected as described above for one-wire operation.

Apparatus employed in the 60-cycle shunt includes coils L6A, L6B, L7A and L7B and capacitors C14, C15 and C16. Coils L6A and L6B and the capacitors are used alternately in the termination of the No. 2 line circuit as described below. When the switch Line is in position 1, one terminal of each of the windings of coils L6A, L6B, L7A and L7B is connected in parallel through terminals 2, 3 and 4 of section A of switch Line and the opposite terminals of each coil are connected in a manner to form a common point through contacts 11 and 12 of section A and contacts 10 and 11 of section B of switch Line. The four coils thus joined in parallel are connected in series with capacitances C14, C15 and C16 which aggregate about 7 microfarads capacitance, one terminal of each of which is connected to the parallel coils through contacts 1, 2 and 10 of section B of switch Line and the opposite terminal of each of which condensers is connected through terminals 4 and 5 of section B of switch Line. This combination is bridged across windings *c* and *d* of relay R, which bridge is closed by connecting winding *c* to terminal 6 of section B of switch Line and winding *d* to terminal 5 of section A of switch Line.

When connected as described, and with the repeater in duplex balance, the shunt current will be independent of the voltage and impedance in series with the home apex. The ampere turn effects in relay R due to the voltages in series with the line will be the same as would result if the mid-impedance point of the shunt were connected directly to the mid-points of other bridged elements, the apex point, and to ground. This relation follows from the characteristics of the balanced line and network circuits, as described for differential duplex operation. The direct-current component of the received signal is not affected by the 60-cycle shunt, and other frequency components required for telegraph transmission are only slightly affected.

*Two-wire operation*

Maximum reduction in the effects of all kinds of line interference, including that due to power induction, earth potentials, and telegraph crossfire is obtained by two-wire operation of the repeater. This requires the provision of a second or neutralizing telegraph line circuit, as nearly as possible identical with the No. 1 or transmission line circuit. When switch Line in the repeater is operated to position 2, the No. 2 line is terminated in the repeater in an impedance similar to that provided in the termination of the No. 1 line. The No. 2 line termination includes line, apex, and network branches, and also bridged elements between the line and network branches, which duplicate the corresponding parts associated with the No. 1 line circuit. Hereinafter the designations No. 1 and No. 2 are used for convenience in referring to corresponding elements in the termination of the No. 1 or transmission line and the No. 2 or neutralizing line. All variable elements in the repeater which are duplicated in the terminations of the two lines, are tandem assembled as single controls in order to maintain the equivalence of the two line terminations under all conditions of repeater adjustment. Line and network windings of relay R in the No. 2 line termination are mutually opposing with respect to currents to or from the No. 2 apex branch, mutually aiding with respect to currents to or from the No. 2 line, and oppositely poled with respect the relay windings associated with the No. 1 line as regards currents in the same direction in both lines. It is evident that if the two lines have substantially the same coupling to the source of the interference, equal current components will be produced in the two lines and their respective terminations, and the resultant effect on relays R at both terminals will be nil. This condition of the system may be called "longitudinal balance." If the No. 1 line is in duplex balance with its network, as described under the description of the network branch, the No. 2 line and network branches will also be in duplex balance. However, longitudinal balance can be provided without duplex balance so long as the two lines and their terminations are identical. In the following paragraphs the termination of the No. 2 line circuit is compared in detail with the termination of the No. 1 line circuit.

Operation of switch Line to position 2 transfers capacitors C14, C15 and C16 from their alternate connection in the 60-cycle shunt to the No. 2 line balancing network, as described hereinafter and transfers coils L6A and L6B from the 60-cycle shunt to the No. 2 apex branch. Ground is supplied through contacts 3—12, section B of switch Line to resistor R41, which matches the battery tap in the No. 1 apex. Resistor R41 is connected through coil L6B, contacts 2—11, section A of the switch Line, through coil L6A, the resistor R42A, resistor 42B and terminal 1 of section A of switch Line. Terminals 1, 2 and 11 of section A of switch Line constitute a common electrical point for this condition. Coils L6A and L6B and resistors R42A and R42B thus form a duplicate of the noise killer in the No. 1 apex circuit, which is made up of coils L1A and L1B and resistors R201 and R202. The junction of resistors R42A and R42B is connected through resistors R110A to R80A thence to the mid-point of resistors R43A and R43B, which is the No. 2 apex point. Resistors R80A to R110A are wired to contacts on section B of the Apex switch, duplicating the relations between resistors R30A to R70A and section A of the Apex switch, thus providing equal values of series resistance in the No. 1 and No. 2 apex branches for all settings of the switch. Resistors R80A to R110A are short-circuited through contacts 7—8, section A of switch OPN2 when this switch is in the position 2, matching the short circuit which is placed across resistors R30A to R70A by contacts 4—5 on the same section when switch OPN2 is operated to position 2, as required at the polar receiving terminal of a type A or B polarential system. The resistor delta consisting of the R43A, R43B and R44 adjacent to the No. 2 apex is completed by resistor R44 in series with jack Bal2 connected across the ends of the resistors R43A and R43B. This arrangement matches the resistors R13A, R13B and R14 and jack Bal1 in the No. 1 apex circuit. An equalizing shunt, including coil L3 and the 0–1000-ohm B section of tandem rheostat EQLB is connected between the lower or line terminals of winding *e* and *f* of relay R, matching a similar shunt made up of coil L2 and section A of the EQLA rheostat, which is connected between the line terminals of windings *c* and *d*. The small resistors in series with coils L2 and L3 can be strapped so as to pad out the two coils to within 5 ohms of the same value, thus maintaining longitudinal balance.

Current in the bridged resistor R44 in the No. 2 line termination bears the same ampere turn relation in windings *e* and *f* of relay R that current in resistor R14 does to the ampere turns due to current in windings *c* and *d*, as described for the normal differential duplex system. When the repeater is in duplex and longitudinal balance, any voltage in series with the No. 2 apex branch will produce no current in resistor R44 and no magnetic effect in the relay R. The total current in resistor R44, under the conditions mentioned, is due to the voltage in series with the No. 2 line, and the ampere turns in relay R are directly proportional to the current produced by this voltage. However, a given current direction in jack Bal2 indicates relay ampere turns which are opposite in sign to those indicated by current in a similar direction through jack Bal1. It is evident, therefore, that a differential measurement of the current in jacks Bal1 and Bal2 gives an indication of the total or resultant ampere turns in relay R due to currents received from lines 1 and 2. Such a method of measurement can be used in two-wire systems to cancel the effects of line interference when the duplex balance is adjusted to give minimum bridge current. A differential measurement of the Bal1 and Bal2 currents can also be used in a preliminary setting of bias current.

Relay R winding *f* is connected in the No. 2 line branch and winding *e* in the No. 2 network branch of the repeater, or vice versa, under the control of switch OPN1. The various positions of this switch also provide "line normal" or "line reversed" connection of windings *c* and *d* to the No. 1 line and network branches as described for the various transmission systems. In each position of the switch, windings *f* and *e* are connected in such a manner as to be magnetically opposing to windings *c* and *d* with respect to currents in the same direction in the No. 1 and No. 2 lines. In positions 0 and 1 of switch OPN1, terminal 8 of winding *f* of the relay is connected through contacts 2–1 of section A to the No. 2 line circuit and terminal 7 of the relay is connected through contacts 2—1 of section B to the No. 2 network circuit, matching the "line normal" arrangement of the No. 1 line and network windings. When switch OPN1 is in position 2, the connections to these relay winding terminals are interchanged, thus matching the "line reversed" connection of the No. 1 line and network windings. Although relay windings *e* and *f* are thus properly poled for longitudinal balance with respect to windings *d* and *c* for any position of switch OPN1, the No. 2 circuit is completed only when switch Line is in position 2.

The No. 2 line branch is extended from contact 1, section A of switch OPN1, through pad resistors R21A and R21B and resistor R23 to the No. 2 line. The No. 2 network branch is extended from contact 1, section B of the OPN1 switch, through pad resistor R25A and R25B to the No. 2 line balancing network. Section B of switch L Pad is wired to No. 2 line and network pad resistors R21A and R21B and R25A and R25B in the same way that section A of the switch L Pad is wired to the No. 1 line and network pad resistors R20A and R20B, R24A and R24B. Thus, when the switch L Pad is operated to any position in order to provide series resistance in the No. 1 line and network branches, identical values of resistance are inserted in the No. 2 line and network branches. When differential duplex operation is being used, pad resistors R20A and R20B, R24A and R24B in the No. 1 line and network branches are short-circuited through contacts 12—1 and 9—10, respectively of section B, switch OPN2, which is in position 0. At the same time contacts 3—4 and 6—7 of the same section short-circuit resistors R21A and R21B, R25A and R25B in the No. 2 line and network branches. From the line pads, the No. 1 and No. 2 line branches of the repeater are extended through resistors R22A and R23 respectively, to the No. 1 and No. 2 lines. The No. 1 and No. 2 network branches are extended to identical line balancing networks, as described below.

The No. 2 line balancing network includes composite set balancing apparatus, a resistance balancing branch and a "timing" branch which duplicate corresponding elements in the No. 1 network. Coil L5 and capacitors C15 and C16, controlled through section B of switch Line and section D of switch L Pad constitute the composite set balancing apparatus of the No. 2 network, corresponding to coil L4 and capacitors C5 and C6 in the No. 1 network, controlled through section C of switch L Pad as described. Capacitors C15 and C16 which are used alternately in the 60-cycle shunt as described in the foregoing, are transferred to the control of switch L Pad, through contacts 12—1 and 5—7, section B of switch Line. Resistor R27 and section B of tandem rheostat BRB form the resistance balancing branch of the No. 2 network, matching R26 and section A of the rheostat BRA which form the corresponding branch of the No. 1 network. Sections A and B of the tandem rheostat TR are the resistance elements of the "timing" branches of the No. 1 and No. 2 networks, respectively. The 0–11 microfarad capacitance in the No. 1 "timing" branch made up of capacitors C7, C8, C9 and C10 is duplicated by a similar capacitance made up of capacitors C14, C11, C12 and C13 in the "timing" branch of the No. 2 network. The latter group of capacitors is controlled through sections C and D of switch C Bal in a manner identical with the control of the former group through sections A and B of the same switch, as described heretofore. Capacitor C14, which is used alternately in the 60-cycle shunt as described is transferred to the control of switch C Bal through contacts 2—12 and 8—9, section B of switch Line. The small protective resistors in series with each of the capacitors in the No. 1 timing branch are also duplicated in the No. 2 circuit.

The No. 1 and No. 2 line terminations, as described above, are completely independent of each other except for the mutual inductances among the relay windings. These mutuals and possible mutuals between the No. 1 and No. 2 lines may result in slightly different adjustments of the balancing network for optimum duplex balance for one and two-wire operation. However, the difference is likely to be so small as to be of no consequence except in full-duplex differential duplex operation. There may also be a slight difference in the optimum equalizer adjustments for one and two-wire systems. This follows from the effect of the relay mutuals, coupling the No. 2 circuit to the No. 1 or transmission circuit. The effect on the received signal is the same as though the inductances of the No. 2 line and network windings of the relay were added to the inductances of the No. 1 line and network windings, changing the shunting ratio between equalizer and relay windings. However, the differences in transmission between one-wire and two-wire systems, aside from the effects of interference, will generally be negligible.

BALANCED LOOP CIRCUIT

The left-hand portion of Fig. 1 which comprises essentially the balanced loop switch Loop and the break relay BK together with the associated resistors, jacks and battery connections, is employed when the line repeater is to be connected on its local side through a balanced loop. Such a connection is usually terminated on its local side after passing through a telegraph test board, where, as heretofore mentioned, it may be extended through a subscriber telegraph loop circuit to a subscriber telegraph station or may be connected back-to-back through another balanced loop and telegraph line repeater circuit such as Figs. 1, 2 and 3 to a remote telegraph repeater station. Alternatively the balanced loop termination per Fig. 1 may be connected to another suitable balanced loop repeater.

In the balanced loop of Fig. 1 all adjustable features required for half and full duplex operation and for reversal of the battery polarities are provided by means of rotary switches and slide wire potentiometers.

Figure 2:
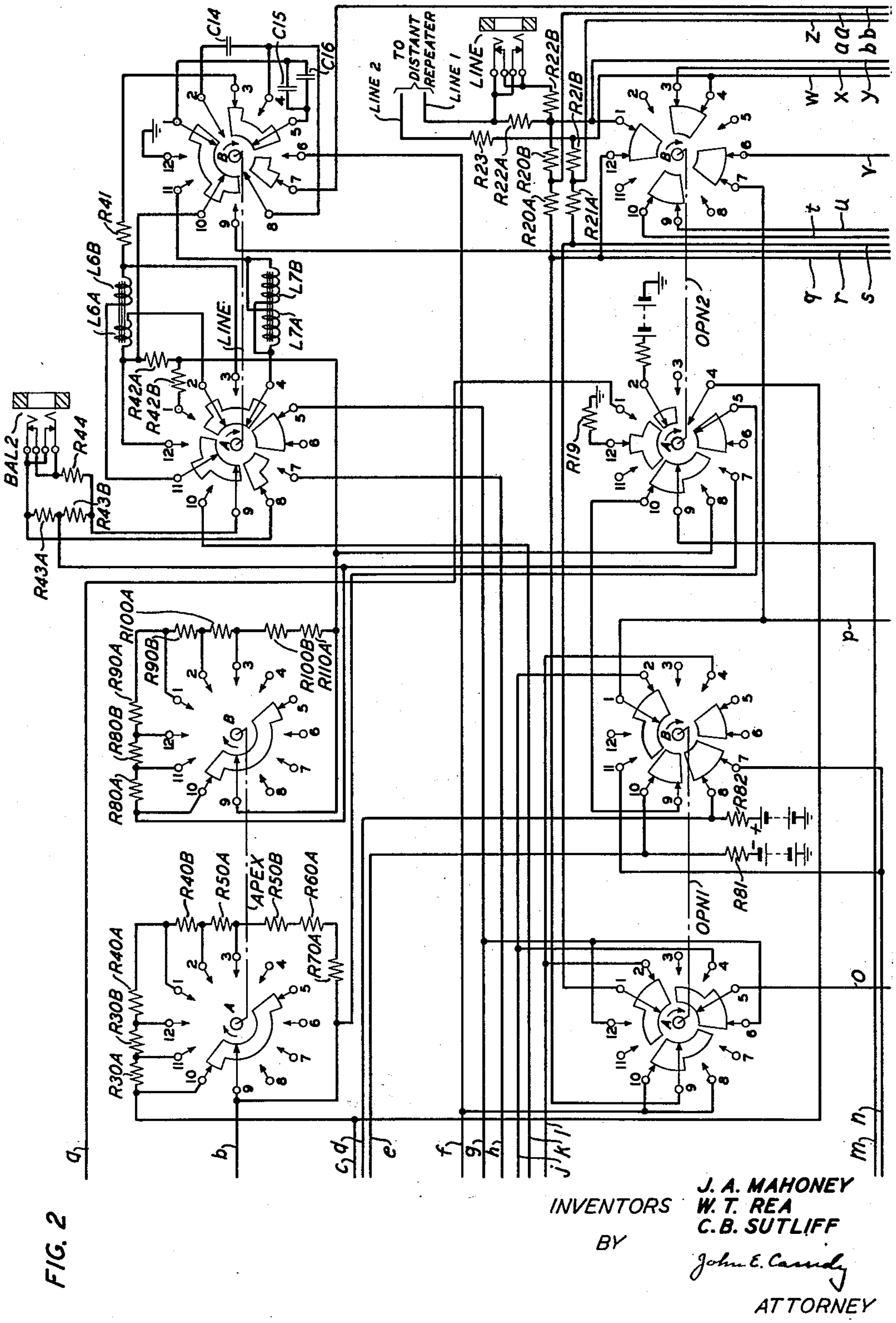
Figure 3:
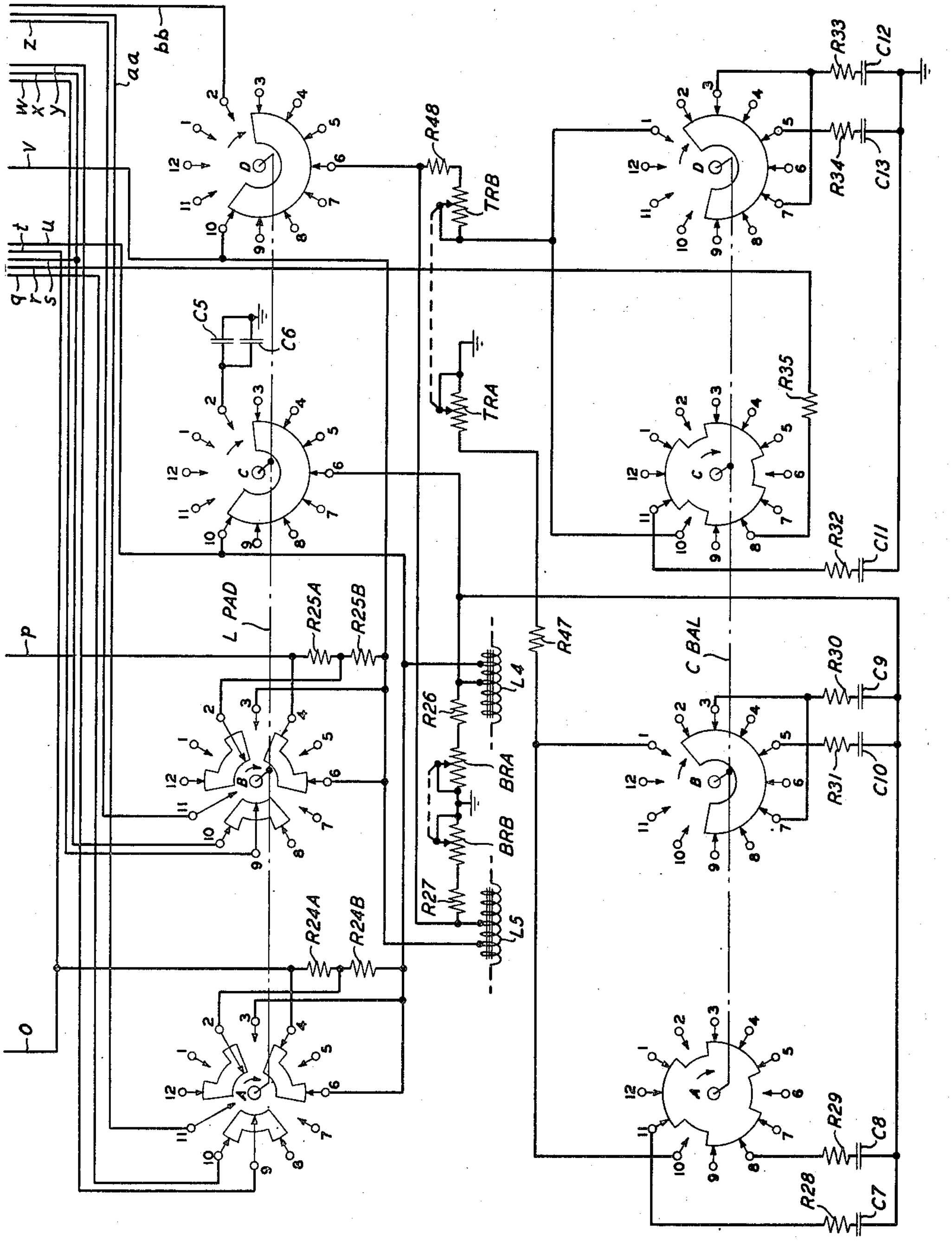

The present balanced loop circuit together with its associated line terminal repeater shown at the right of Fig. 1 and in Figs. 2 and 3 provides means for the following types of loop operation.

*Half-duplex battery normal*

This provides for half-duplex transmission to and from a station loop or to and from another balanced loop repeater connected half-duplex battery reversed.

*Half-duplex battery reversed*

This provides for half-duplex transmission to and from another balanced loop repeater connected half-duplex battery normal.

*Full-duplex battery normal*

This provides for full-duplex transmission to and from a station or to and from another balanced loop repeater connected full-duplex battery reversed.

*Full-duplex battery reversed*

This provides for full-duplex transmission to and from another balanced loop repeater connected full-duplex battery normal.

DESCRIPTION OF OPERATION OF BALANCED LOOP CIRCUIT

*General*

The windings of relay BK of the balanced loop circuit and the corresponding windings of relay S in the associated line repeater are connected in series in a loop circuit which may extend to a teletypewriter subscriber station or to the loop circuit of another repeater which is interconnected for through operation. Marking and spacing signals which correspond to current and no current respectively in the loop circuit are transmitted through the associated line repeater to the line.

Marking and spacing signals received from the line, shown extending through the right in Fig. 2, by the associated line repeater are transmitted to the loop by the alternate polarities of telegraph batteries supplied through the loop circuit to the contacts of the receiving relay R in the line repeater.

The loop circuit may be used for either half or full-duplex transmission. In half-duplex transmission loop SL is used for transmission to and from the subscriber's station or to and from the interconnected repeater. Thus transmission is possible in only one direction at a time.

In full-duplex transmission two loops are used, the loop RL for transmission to the subscriber station or interconnecting repeater and the loop SL for transmission from the subscriber's station or interconnecting repeater. Simultaneous transmission in both directions may be feasible depending upon the type of line transmission and the capabilities of the associated line repeater.

Appropriate relay connections and battery supply polarities for connecting the balanced loop to a station loop or to the loop of an interconnecting repeater for through operation either half or full-duplex are controlled by the switch Loop.

Relay BK provides a clean break for half-duplex operation so that the local sending can be interrupted by the remote terminal. This relay has no function during full-duplex transmission.

DETAILED DESCRIPTION OF OPERATION OF BALANCED LOOP CIRCUIT

*Half-duplex battery normal*

CONDITIONING THE CIRCUIT FOR OPERATION TO A STATION

Operate switch Loop to position 0, which is the position in which it appears in Fig. 1. Positive telegraph battery is connected to lead SL at the teletypewriter circuit or telegraph test board.

CONDITIONING THE CIRCUIT FOR THROUGH OPERATION TO AN INTERCONNECTED REPEATER

To condition the repeater for balanced loop half duplex through operation, switch Loop is operated to position 0, and the sending loop of the present repeater is connected to the sending loop of the interconnected balanced loop repeater at the telegraph test board. The interconnected repeater is arranged for half-duplex battery reversed.

DETAILED DESCRIPTION OF CIRCUIT

With the aid of Table G in the foregoing the following circuits may be traced. The lead which connects to the marking contact of the receiving relay R in the present line terminal repeater may be traced through section A of the switch Loop, contacts 4—6 thence through resistor R123 to a −130 volt telegraph battery. Another circuit may be traced from the lead which connects to the armature of the receiving relay R through section B of switch Loop, contacts 9—11 to the apex of relay S. The lead from the spacing contact of receiving relay R may be traced through section A of switch Loop, contacts 7—9 to the armature of relay BK. The leads which connect to the right-hand terminals of the upper and lower windings respectively of relay S may be traced to the right-hand terminals of the upper and lower windings respectively of the relay BK. The left-hand terminal of the upper winding of relay BK connects through section B of the switch Loop, contacts 3—2, to the artificial line consisting of resistance R3 which is shunted by the C1 condenser, thence through the resistance R4 to ground. The left-hand terminal of the lower winding of relay BK connects through section B of switch Loop, contacts 5—4 to resistance R5A which is shunted by resistance R5B and jack Send Loop Meter, thence through the adjustable resistance SL and jack Send Loop to lead SL. The marking contact of relay BK is connected through section A of switch Loop contacts 10—1, thence through resistor R124 to +130 volt telegraph battery. The spacing contact of relay BK is connected through section A of switch Loop, contacts 2—6, thence through resistor R123 to −130 volt battery.

*Description of transmission*

It will be seen that when the receiving relay R is on its marking contact —130 volt telegraph battery is supplied to the apex of the S relay. Relays S and BK are so poled that this will cause a spacing current of approximately 30 mils to flow in their top windings. When resistance SL is properly adjusted, a marking current of 62.5 mils will flow in their bottom windings and the loop circuit, due to the combined effect of the apex battery and the +130 volts applied to lead SL at either the test board or associated balanced loop repeater. Since the marking current is approximately twice the value of the spacing current, the relays S and BK will be held on their marking contacts. When the receiving relay R operates to spacing, +130 volt telegraph battery is applied to the apex of relay S through the armature and marking contacts of relay BK. Since the lead SL is terminated in +130 volt telegraph battery either at the test board or in the associated balanced loop repeater, there will be substantially no current flowing in the bottom windings of relays S and BK. Thus, a spacing signal will be transmitted to the loop or to the associated balanced loop repeater. The current in the top windings is now reversed and holds the armatures of relays S and BK on their marking contacts. Thus, signals from the receiving relay R will be transmitted to the sending loop or interconnected balanced loop repeater without affecting relays S and BK.

If operation is to a station and the receiving relay R is on its marking contact, it will be seen that when the sending loop is opened, relays S and BK will be operated to their spacing contacts by the biasing current flowing in their top windings. Thus, a spacing signal is transmitted to the line.

In through operation, when the receiving relay R is on its marking contact, it will be seen that the operation of the receiving relay in the interconnected balanced loop repeater to spacing will supply negative telegraph battery to lead SL. Hence, the current in the bottom winding of relays S and BK will be reduced to substantially zero and bias current flowing in the top windings will operate these relays to their spacing contacts. Thus, a spacing signal is transmitted to the line.

Operation of relay BK to spacing changes the polarity of the spacing contact of the receiving relay R in the present repeater from +130 volts to —130 volts telegraph battery. It will now be seen that the operation of the receiving relay to spacing will not interfere with the transmission of the spacing signal to the line from the sending loop or interconnected balanced loop repeater. However, during the transmission of the marking signal from the sending loop or interconnected balanced loop repeater, the operation of the receiving relay R to spacing will terminate the sending apex in +130 volt telegraph battery. Since lead SL is terminated in +130 volt telegraph battery, substantially no current will flow in the bottom windings and the sending loop. Relays S and BK will now be held on the marking contacts by the marking current flowing in their top windings; so that although a spacing signal is being received, only a marking signal can be transmitted to the line. Thus a break signal is provided.

*Half-duplex battery reversed*

CONDITIONING THE CIRCUIT FOR THROUGH OPERATION TO AN INTERCONNECTED REPEATER

To condition the circuit for half-duplex battery reversed for through operation the switch Loop is operated to position 1. The sending loop of the present balanced loop is connected to the sending loop of the interconnected balanced loop repeater at the telegraph test board. The interconnected repeater is conditioned for half-duplex battery normal.

DETAILED DESCRIPTION OF CIRCUIT

With the aid of Table G in the foregoing the following circuits may be traced. The lead which connects to the marking contacts of the receiving relay R may be traced through section A of switch Loop, contacts 11—1, thence through resistor R124 to +130 volt telegraph battery. Another circuit may be traced from the lead which connects to the armature of the receiving relay R through section B of switch Loop, contacts 9—11 to the lead which connects to the apex of the relay S. The lead which terminates in the spacing contact of receiving relay R may be traced through section A of switch Loop, contacts 8—9 to the armature of relay BK. The leads which connect to the right-hand terminals of the top and bottom windings respectively of relay S may be traced to the right-hand terminals of the top and bottom windings respectively of relay BK. The left-hand terminal of the lower winding of relay BK connects through section B of switch Loop, contacts 5—6, to the artificial line consisting of resistance R3, which is shunted by condenser C1, thence through resistance R4 to ground. The upper right-hand terminal of relay BK connects through section B of the switch Loop, contacts 3—4 to resistance R5A, which is shunted by the R5B resistance and the jack Send Loop Meter, thence through adjustable resistance SL and jack Send Loop to lead SL. The marking contact of relay BK is connected through section A of switch Loop, contacts 5—6, thence through the resistor R123 to —130 volt telegraph battery. The spacing contact of the relay BK is connected through section A of switch Loop, contacts 1—2, thence through the resistor R124 to +130 volt telegraph battery.

DESCRIPTION OF TRANSMISSION

It will be seen that when the receiving relay R is on its marking contact +130 volt telegraph battery is supplied to the apex of relay S. The windings of relays S and BK are so poled that this will cause a spacing current of approximately 30 mils to flow in their bottom windings. When the potentiometer SL is properly adjusted, a marking current of 62.5 mils will flow in their top windings and in the loop due to the combined effect of the apex battery and the —130 volts applied to lead SL from the interconnected balanced loop repeater. Since the marking current is approximately twice the value of the spacing current, the armatures of relays S and BK will be held on their marking contacts. When the receiving relay R operates to spacing, —130 volt telegraph battery is applied to the apex of relay S through the armature and marking contacts of relay BK. Since lead SL is terminated in —130 volt telegraph battery in the interconnected balanced loop repeater there will be substantially no current flowing in the top windings of relays S and BK and lead SL. Thus, a spacing signal will be transmitted to the interconnected balanced loop repeater. The current in the bottom windings is now reversed and holds relays S and BK on their marking contacts. Thus, signals from the receiving relay R will be transmitted to the sending loop without affecting relay S or BK.

When the receiving relay R is on its marking contact, it will be seen that operation of the receiving relay in the interconnected balanced loop repeater to spacing will supply positive telegraph battery to lead SL. Hence, the current in the top windings of relays S and BK will be reduced substantially to zero and the bias current flowing in the bottom windings will operate these relays to their spacing contacts. Thus, a spacing signal is transmitted to the line. Operation of relay BK to spacing changes the polarity of the spacing contact of the receiving relay R from −130 volts to +130 volts. It will now be seen that the operation of the receiving relay to spacing will not interfere with the transmission of the spacing signal to the line. However, during the transmission of a marking signal from the interconnected balanced loop repeater, the operation of the receiving relay of the present repeater to spacing will terminate the sending apex in −130 volt telegraph battery. Since lead SL is terminated in −130 volt telegraph battery, substantially no current will flow in the top windings and in the sending loop. Relays S and BK will now be held on their marking contacts by the marking current flowing in the bottom windings, so that although a spacing signal is being received only a marking signal can be transmitted to the line. Thus, a break signal is provided.

*Full-duplex battery normal*

In conditioning the circuit for operation to a station, switch Loop is operated to position 2. Positive telegraph battery is applied to leads SL and RL at the teletypewriter circuit or telegraph test board.

In conditioning the circuit for through operation, switch Loop is operated to position 1. The sending loop of the present balanced loop is connected to the receiving loop of the interconnected balanced loop repeater. The receiving loop of the present balanced loop is connected to the sending loop of the interconnected balanced loop repeater. The interconnected repeater is arranged for full-duplex battery reversed.

DETAILED DESCRIPTION OF THE CIRCUIT

With the aid of Table G, the following circuits may be traced. The lead which connects to the marking contact of the receiving relay R may be traced through section A of the switch Loop, contacts 4—6, thence through resistor R123 to −130 volt telegraph battery. Another circuit may be traced from the lead which connects to the armature of the receiving relay R through section B of the switch Loop, contacts 7—9 to resistance R1A which is shunted by resistance 1B and the Rec Loop Meter, thence through resistance R2, adjustable resistance RL and jack Rec Loop to the lead RL. The lead which terminates in the spacing contact of the receiving relay R may be traced through section A of switch Loop, contacts 12—1, thence through resistor R124 to +130 volt telegraph battery. The lead which connects to the apex of the relay S may be traced through section B of switch Loop, contacts 11—12 and resistor R129 to −130 volt telegraph battery. The leads which connect to the right-hand terminals of the top and bottom windings respectively of the relay S may be traced to the right-hand terminals of the top and bottom windings respectively of relay BK. The left-hand terminal of the lower winding of relay BK connects through section B of switch Loop, contacts 4—5 to the resistance R5A which is shunted by the resistance R5B and jack Send Loop Meter, thence through variable resistance SL and jack Send Loop to the lead SL. The left-hand terminal of the top winding of relay BK connects through section B of switch Loop, contacts 2—3 to the artificial line, consisting of resistance R3 shunted by condenser C1, thence through the resistance R4 to ground. The armature and contacts of the relay BK are open.

DESCRIPTION OF TRANSMISSION

When the receiving relay R is on its marking contact and the adjustable resistor RL is properly adjusted, 62.5 mils will flow in the receiving loop. When the receiving relay operates to spacing, substantially no current will flow in the receiving loop since the polarity supplied to lead RL from the test board or interconnected balanced loop repeater and the polarity of the spacing contact of the receiving relay are the same. Thus, signals from the receiving relay R are transmitted directly to the station or to the interconnected balanced loop repeater.

The apex of the sending relay S is terminated in −130 volt telegraph battery. When potentiometer SL is properly adjusted, there will be a marking current of 62.5 mils flowing in the bottom windings and a spacing current of approximately 30 mils flowing in the top windings of relays S and BK. Since the marking current is approximately twice the value of the spacing current, relays S and BK will be held on their marking contacts. When operation is to a station and the sending loop is opened for the transmission of a spacing signal, the relays S and BK operate to spacing, since there is no current flowing in their bottom winding. In through operation when the receiving relay in the interconnected balanced loop repeater operates to spacing, substantially no current will flow in the bottom windings of relays S and BK since the polarity supplied by the receiving relay's spacing contact is the same as that of the apex of relays S and BK. Relays S and BK will be operated to their spacing contact by the biasing current flowing in their top windings. It will thus be seen that the sending and receiving loops are entirely independent, that is, signals from the receiving relay R will be transmitted directly to the station receiving loop or to the sending loop of the interconnected balanced loop repeater while simultaneously signals from the sending loop of a station or the receiving loop of an interconnected balanced loop repeater will operate the sending relay R. Thus, full-duplex transmission is provided.

*Full-duplex battery reversed*

To condition the circuit for through operation switch Loop is operated to position 3. The sending loop of the balanced loop is connected to the receiving loop of the interconnected balanced loop repeater. The receiving loop of the balanced loop is connected to the sending loop of the interconnected balanced loop repeater. The associated balanced loop repeater is arranged for full-duplex battery normal.

DETAILED DESCRIPTION OF THE CIRCUIT

With the aid of Table G in the foregoing, the following circuits may be traced. The lead which connects to the marking contact of receiving relay R in the terminal repeater may be traced through section A of the switch Loop, contacts 1—4, thence through resistor R124 to +130 volt telegraph battery. Another circuit may be traced from the lead which connects to the armature of receiving relay R through section B of switch Loop, contacts 8—9, through resistance R1A which is shunted by resistance R1B and the jack Rec Loop Meter, resistance R2, thence through the adjustable resistor RL and jack Rec Loop to the lead RL. The lead which is terminated in the spacing contact of receiving relay R may be traced through section A of switch Loop, contacts 6—7, through resistor R123 to −130 volt telegraph battery. The lead which connects to the apex of relay S may be traced through section B of switch Loop, contacts 1—11 and resistor R131 to +130 volt telegraph battery. The leads which connect respectively to the right-hand terminals of the top and bottom windings of relay S may be traced to the corresponding terminals, respectively, of relay BK. The left-hand terminal of the bottom winding of relay BK connects through section B of switch Loop, contacts 5—6, through the artificial line consisting of resistance R3 shunted by condenser C1, thence through the resistance R4 to ground. The left-hand terminal of the top winding of relay BK connects through section B of switch Loop, contacts 3—4, to the R5A resistance which is shunted by the R5B resistance and the jack Send Loop Meter, thence through adjustable resistance SL and jack Send Loop to lead SL. The armature and marking contacts of the relay BK are connected together and through section A of switch Loop, contacts 5—6—9 to −130 volt battery.

DESCRIPTION OF TRANSMISSION

The operation of the circuit for this condition is the same as that described for full-duplex battery normal. In this case, however, the bottom windings of relays S and BK are used as biasing windings and the top windings are in series with the sending loop, and the RL and SL leads are terminated in the −130 volt telegraph battery in the interconnected balanced loop repeater.

ELECTRONIC COUPLING UNIT CIRCUIT

Figures 5, 8:
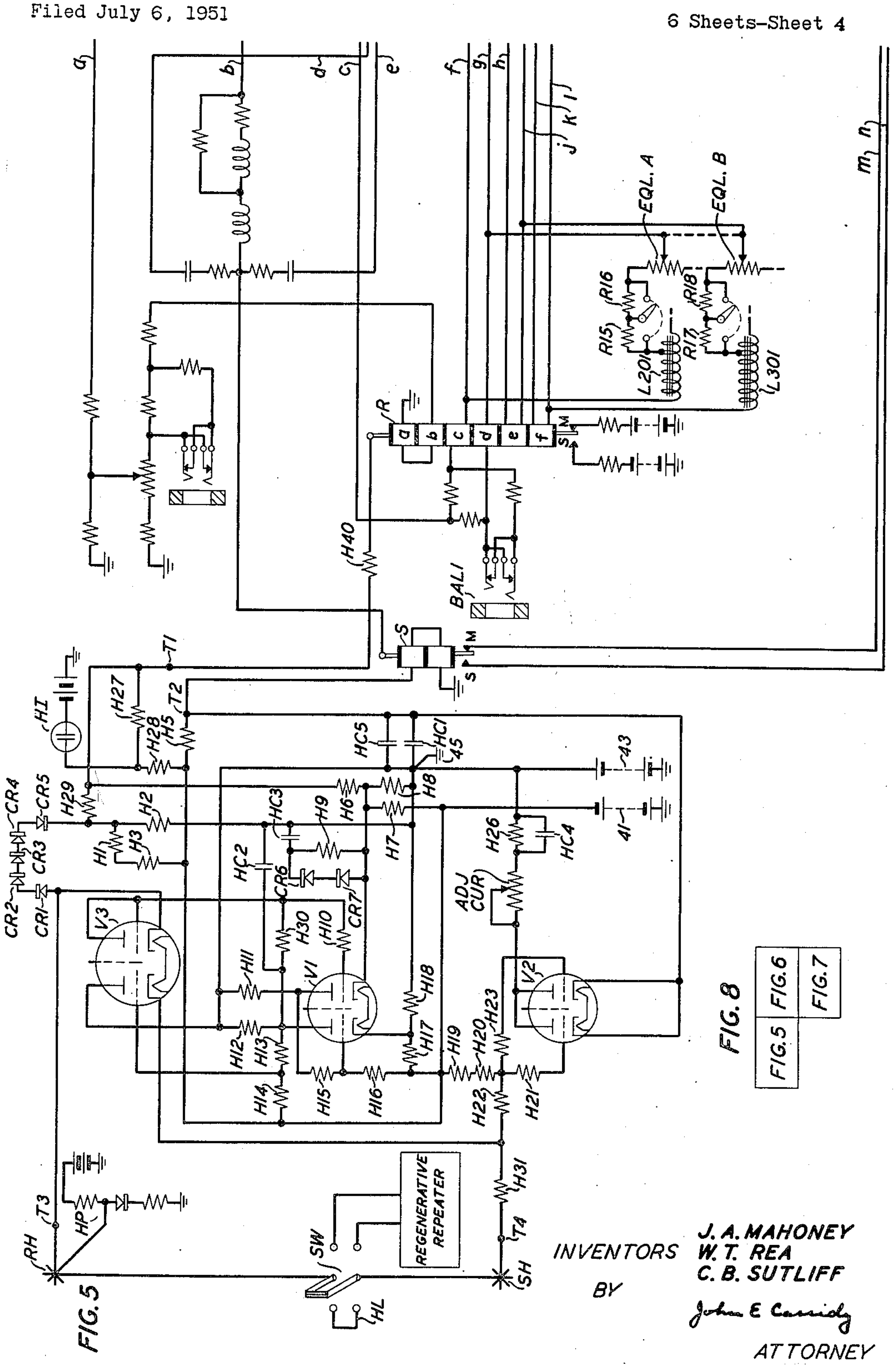
Figure 6:
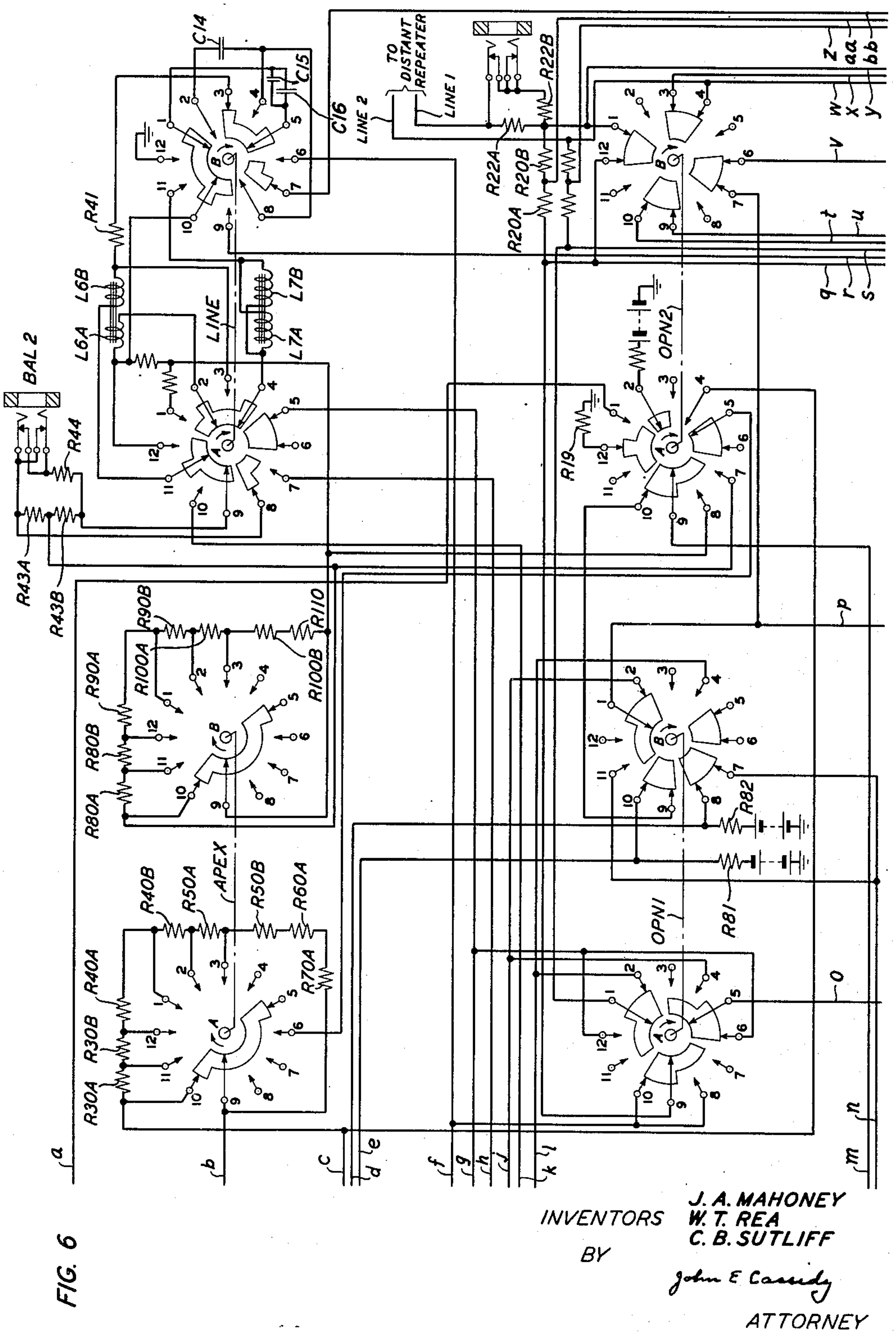
Figure 7:
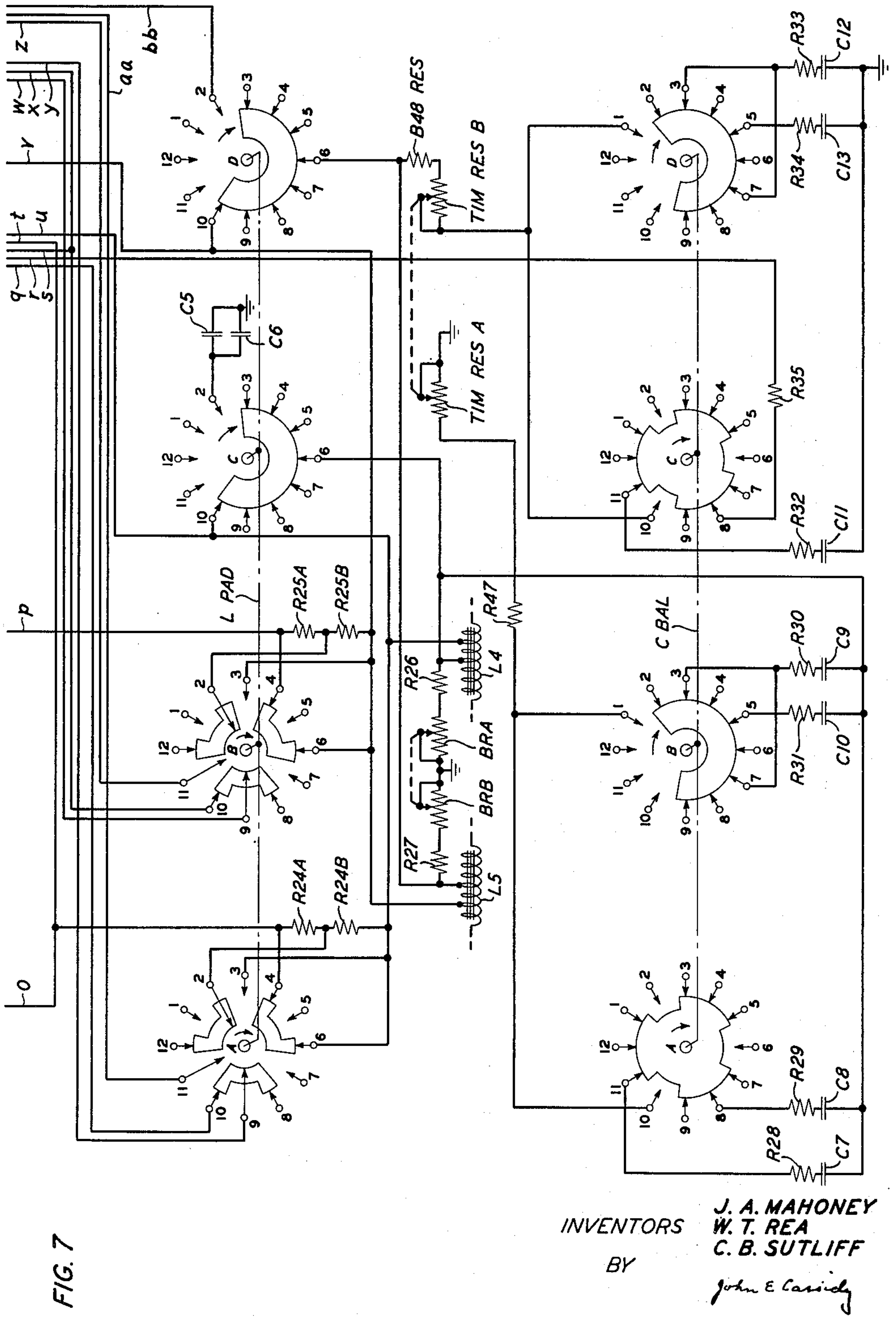

Refer now to Figs. 5, 6 and 7 arranged as in Fig. 8. This arrangement differs from that of Figs. 1, 2 and 3 arranged as in Fig. 4 in that the local side of the repeater is connected through an electronic coupling unit, shown at the left of Fig. 4 to a telegraph hub circuit.

The electronic coupling unit, sometimes called a hub repeater control circuit, comprises essentially three double-section vacuum tubes V1, V2 and V3, and various combinations of resistors, potentiometers and rectifiers illustrated as being of the dry metal oxide type. The broad function of the circuit is to interconnect the line repeater through a central electrical point or hub, to which numbers of other telegraph repeaters or subscriber's telegraph loops, each equipped with its own individual electronic coupling unit circuit, are interconnected, in such manner that any one of the circuits at any particular time may transmit to all of the others connected through the same hub simultaneously.

In order to perform this function, it is necessary for each electronic coupling unit to regulate transmission through its sending leg. If any other repeater connected to the hub transmits toward the hub the electronic control circuit in each other repeater maintains its sending path open to permit the signal to pass. When the receiving leg of a particular repeater transmits toward the hub, the electronic coupling unit in the same repeater blocks its own sending leg to prevent the communication signals from passing back over the circuit in which they originated. If two repeaters attempt to transmit simultaneously the coupling unit in each repeater opens its sending leg and mutilated signals caused by the abnormal condition are transmitted over every circuit connected to the hub as an indication of the abnormal condition.

In transmission inward to the hub point, the coupling unit converts ±130 volt polar signals from the receiving relay R of the line repeater to the voltage signals used on the receiving hub. In transmission outward from the hub point the coupling unit converts the voltage signals of the send hub to a polar-current signal which drives the sending relays, such as relay S, of the associated line repeaters.

When used in a half-duplex circuit, the coupling unit performs a duplexing function by preventing the associated repeater from receiving from the sending hub, signals which it itself originated. When used in a full-duplex circuit, this duplexing feature is prevented from functioning by use of a different type of connection to the hub point. No duplex control lead is required.

In half-duplex service the coupling unit recognizes the occurrence of a "double space" that is a simultaneous spacing condition from two telegraph facilities connected to the same concentration group and while the double-space condition prevails the duplexing feature is disabled, allowing a space to be sent out on all the connected line facilities including those sending the spaces. This is beneficial in obtaining a fast break and in insuring an indication of simultaneous sending in a large half-duplex network.

TRANSMISSION INWARD TO HUB

*Marking condition*

In the marking condition, as shown, the receiving relay R of the line repeater applies +130 volts through resistance H40 to terminal T1 of the coupling unit. The network consisting of resistors H29, H1, H2 and H3 reduces this marking voltage to a value of about +65 volts at the connection to the varistor string CR1 to CR5. Terminal T3 of the coupling unit connects to the receiving hub RH which is terminated in the hub potentiometer HP. This potentiometer has an impedance of 2460 ohms and provides a voltage of +60 volts. A voltage of about 5 volts is thus applied across the varistor string CR1 to CR5 in the reverse direction during a marking condition. The varistors have a very high resistance in this condition and the receiving relay R of the line repeater is effectively isolated from the hub potentiometer. The marking voltage on the receiving hub is therefore +60 volts as determined by the hub potentiometer HP.

*Spacing condition*

In the spacing condition the armature of the receiving relay R of the line repeater applies −130 volts to terminal T1 of the coupling unit. The network consisting of resistors H29, H1, H2 and H3 reduces this voltage to an open circuit value of −105 volts at the connection to the varistor string CR1 to CR5. The varistor string thus has a voltage across it in the forward direction and it assumes a resistance of about 500 ohms. In this spacing condition terminal T3 of the coupling unit appears to the hub potentiometer as a −105 volt source of potential having a resistance of about 2500 ohms. This causes current to flow from the hub potentiometer HP toward the coupling unit and the hub potential falls in a negative direction from +60 to below zero. The hub potentiometer HP has varistors inserted in the branch to ground so that for hub voltages below zero the potentiometer appears as a 5333-ohm resistance to +130 volts. This results in a final spacing condition of 30 milliamperes flowing from the hub toward the coupling unit and a receiving hub potential of −30 volts. Other coupling units, indicated by the straps or spurs connected to the receiving hub RH connecting to the same hub potentiometer but with their associated line or loop repeaters sending a mark toward the hub have no appreciable effect on the −30 volt spacing potential because of the high resistance of their CR1 to CR5 varistor strings.

*Double space condition*

If two coupling units each apply a spacing condition to the receiving hub, the result of the two −105 volt 2500-ohm sources in parallel causes the hub potential to fall to a value of −60 volts. In this case each coupling unit draws about 18 milliamperes from the hub potentiometer.

*Hit indication*

The circuit includes a connection to a neon lamp HI for hit indication purposes. The plus and minus voltages from the line or loop repeater which appear at terminal T1 of the coupling unit are coupled to lamp HI via potentiometer H27—H28. This gives a marking voltage of about −50 volts and a spacing voltage of about −125 volts on the lamp lead. By connecting the right-hand terminal of the neon lamp to −24 volt battery, a marking voltage of about 26 volts and a spacing voltage of about 100 volts is applied across the lamp. Only the spacing voltage is sufficient to ionize the lamp so that a visible indication of an incoming space is obtained. This feature may be used for hit detection or as an aid in locating spacing circuit legs in a concentration group.

*Transmission outward from hub*

If no regenerative repeater is connected between the receiving and sending hub multiples, the two multiples are connected directly together by the operation of double-pole double-throw switch SW to the left. This interconnects the receiving hub RH and the sending hub SH through the hub link HL. When a regenerative repeater is used it produces voltage on the sending hub of +60 mark and −30 space with no double space condition existing.

*Marking condition*

During a mark, a +60 volt potential is applied to terminal T4 of the coupling unit from the sending hub. As will be explained later, when transmission is to be allowed to pass outward from the sending hub, the potential at the junction of resistors H13 and H14 is about −50 volts. This voltage applied to the left grid of vacuum tube V3 causes its left cathode to appear as an open circuit for voltages more positive than about −40 volts. The +60 volts on the send hub is applied through the potentiometer string H31, H22, H20 and H19 which connects to −130 volt source 41. At the junction of H22 and H20 a marking voltage of +50 volts is applied to the grids of the double triode vacuum tube V2 through resistors H23 and H21, respectively. Both triode sections of tube V2 are thus held conducting and plate current flows from +130 volt source 43 via resistor H26 and the adjustable rheostat Adj Cur and through the triode sections to terminal T2 and thence through the windings of the sending relay such as relay S in the connecting line or loop repeater to ground. Resistors H23 and H21 prevent high frequency parasitic oscillations of tube V2. The rheostat Adj Cur is adjusted to give a total plate current of 14 milliamperes. Resistor H5 connecting from terminal T2 to −130 volt source 41 provides 7.0 milliamperes of spacing bias current to the sending relays in the line or loop repeater. The sending relays are thus held marking with a net current of 7.0 milliamperes.

*Spacing condition*

During a spacing condition a −30 volt potential is applied to terminal T4 from the sending hub. A −30 volt potential is thus applied through potentiometer string H31, H22, H20 and H19 which connects to −130 volt source 41. A potential at the junction of H22 and H20 of −35 volts is applied to grids of tube V2 via resistors H23 and H21, respectively. This maintains tube V2 in a cut-off condition. With zero plate current, the sending relay in the connecting line repeater is held spacing by the 7.0 milliamperes of bias current flowing through resistor H5. The sending relay of the associated repeater is thus driven by an effective polar current of ±7.0 milliamperes. Parallel connected capacitors HC1 and HC5 connected across the relay windings lower the higher frequency impedance of the windings and prevents the transient voltages developed across the winding from being great enough to interfere with the grid control of tube V2 when driven by a +50 volt, −35 volt signal. Capacitor HC4 aids in producing a symmetrical wave form through the relay windings.

DUPLEX CONTROL AND DOUBLE SPACE RECOGNITION

Double triode vacuum tube V1 is connected as a "flip-flop" or "trigger" circuit arranged to recognize the direction of transmission through the coupling unit and to recognize the occurrence of a double space condition on the receiving hub. The input from the receiving relay R of the associated repeater, which appears on terminal T1, is connected to the right cathode of tube V1 via the network consisting of resistors H6 and H7, the lower terminal of which is connected to —130 volt source 41 and H8, the lower terminal of which is connected to ground 45. The voltage on the receiving hub, appearing on terminal T3, is connected to the right grid of tube V1 via the right half of tube V3, connected as a diode, and resistor H10.

With the receiving relay of the associated repeater in a marking condition, the right cathode of tube V1 is held at a potential of +20 volts by the network H6, H7 and H8. With the receiving hub also in a marking condition tube V1 may stand either with the right side conducting and the left side cut off, or vice versa, depending upon the direction of transmission of the last spacing signal.

*Inward transmission to the hub*

When the armature of the receiving relay R of the associated repeater operates to engage its spacing contact S, the potential of the right cathode of tube V1 is lowered to —45 volts by the coupling network H6, H7, H8. At the same time, the receiving hub potential falls to —30 volts. This —30 volt potential is applied through the right side of tube V3 and through resistor H10 to the right grid of tube V1 and holds the right section of tube V3 in a conducting condition since the cathode is at —45 volts and the grid is at —30 volts. The plate of the right section of tube V1 is coupled to the grid of the left section by the potentiometer consisting of resistors H15 and H16. Thus with the right section in a conducting condition, the left section is held cut off. This causes the plate of the left section to have a potential near +130 volts. The plate of the left section of tube V1 is coupled to the grid of the left section of tube V3 by means of the potentiometer consisting of resistors H13 and H14. This potentiometer impresses a voltage of about +20 volts on this grid during the spacing interval being described. This results in the left cathode of tube V3 appearing as a low resistance source of about +25 volts for all impressed voltages more negative than +25. When the spacing condition of —30 volts reaches terminal T4 of the coupling unit from the sending hub, the left cathode of tube V3 remains at a voltage of about +25 and prevents the space signal from cutting off tube V2. The sending relay S in the associated repeater is therefore prevented from receiving the space which was originated by the receiving relay of the same repeater.

When the armature of the receiving relay R of the repeater returns to a marking condition, the cathode of the right section of tube V1 returns to +20 volts and the receiving hub potential returns to +60 volts. With the receiving hub RH at +60 volts and the left plate of tube V1 near +130 volts a potential of about +60 is applied to the right grid of tube V1 through resistor H10. This maintains the right section of V1 in a conducting state since the cathode is at +20 volts and the grid is driven from +60 volts. Thus, for transmission inward to the hub, the left cathode of tube V3 continuously holds the potential applied through resistor H22 to the grids of tube V2 at a value near +25 volts and prevents any spacing intervals from being repeated back to the sending relay such as relay S of the repeater originating the transmission. It is necessary that this "hold" condition be applied continuously and not just during the duration of the space on the receiving hub, because the insertion of a regenerative repeater between the receiving and sending hubs causes the spacing intervals to appear at the sending hub after a delay of at least one-half unit pulse. Therefore, a space on the sending hub must, at times, be blocked from reaching tube V2 when the receiving hub is marking. Capacitor HC2 serves to slow the "flip-flop" action of tube V1 so as to prevent its operation on transient conditions of very short duration. Capacitor HC3 in series with the combination of varistors CR6 and CR7 and resistor H9 is connected between the right cathode of tube V1 and ground. This causes the mark-to-space transitition of the cathode to occur more rapidly than the space-to-mark transition which is necessary when the hub wave form is rounded by the capacitance to ground of the connecting switchboard cables.

*Outward transmission from the service board*

When a spacing potential is produced on the receiving hub RH by some other connecting repeater, a potential near to —30 volts is applied through the right half of tube V3 and resistor H10 to the right grid of tube V1 in the same manner as described for inward transmission. However, since the receiving relay R of the line repeater remains marking the cathode of the right section of tube V1 remains at +20 volts. This results in the right section of tube V1 being cut off and the left section conducting. The cathode of the left section is held at a potential of about —44 volts by potentiometer H17—H18 so that the potential at the left plate of tube V1 falls to about zero or slightly negative. When the receiving hub RH returns to the marking condition of +60 volts, the diode-connected right-hand side of V3 is non-conducting and the near zero potential at the left plate of tube V1 is applied through resistors H30 and H10 to the right grid of tube V1. With the cathode of the right section at +20 volts and the grid near zero volts, the right section remains cut off during the marking interval following a space sent from some other repeater.

For periods of outward transmission, the plate of the left section of tube V1 thus remains continuously at a potential near zero. This causes the coupling potentiometer string H13 and H14 to apply a voltage to the left grid of tube V3 of about —50 volts. This makes the left cathode of tubes V3 appear as an open circuit for both the +60 volt mark and the —30 volt space conditions. Thus spaces are able to reach the grids of tube V2 and operate the sending relay of the associated repeater. When the double space condition of —60 volts appears on the sending hub SH the left cathode of tube V3 does not become more negative than about —40 volts.

*Double space condition*

When the double space condition of —60 volts occurs on the receiving hub, this potential is applied through the right side of tube V3 and resistor H10 to the right grid of tube V1. This causes the right section of tube V1 to cut off even if the cathode is at the spacing condition of —45 volts. Thus the —30 volt condition on the sending hub is allowed to pass to tube V2 and operate the sending relay of the associated repeater to space. Thus when no regenerative repeater is used a space may be immediately received from another repeater connected to the same hub even though the associated repeater be at the time transmitting a space toward the hub. Any two repeaters connected to the same hub are thus essentially provided full-duplex transmission by the combination of the three-condition hub and the duplexing feature of the coupling units. This is sometimes called a double-space by-pass feature since it allows two space signals traveling in opposite directions to pass each other at a half-duplex concentration group. This is in contrast with the usual break feature previously employed wherein the space first to reach a half-duplex switching point blocks the transmission of a space in the opposite direction for the duration of the first space.

*Transmission of a break signal*

When no regenerative repeater is used a break signal is transmitted through the hub point without delay as a single or a double space.

When a regenerative repeater is used, the break will be subjected to a delay of one-half a unit pulse if the regenerative repeater is in an idle condition. If the break arrives during a selection cycle of the regenerative repeater when a space-to-mark selection has just been made, the break may be subjected to a delay approaching a full unit pulse. If the arrival of the break occurs when the regenerative repeater has a spacing output then the break is passed on without delay.

What is claimed is:

1. In a telegraph repeater, a polar telegraph relay, a line winding thereon connected to a transmission line, a balancing winding on said relay, a first adjustable resistance branch connected between said balancing winding and ground, a second adjustable branch connected between said balancing winding and ground, said branches in parallel, said first resistance branch adjustable for balancing the line with respect to direct current, said second adjustable branch adjustable for balancing the line with respect to transient currents, said second branch comprising a variable resistance in series with a variable capacitance.

2. In a telegraph repeater, a polar telegraph relay, a line winding thereon connected to a transmission line, a balancing winding on said relay, a first adjustable resistance branch connected between said balancing winding and ground, a second adjustable branch connected between said balancing winding and ground, said branches connected in parallel, said first resistance branch adjustable for balancing the line with respect to direct current, said second adjustable branch adjustable for balancing the line with respect to transient currents, said second branch comprising a variable resistance in series through a switch with a variable capacitance, said capacitance variable through said switch in discrete equal amounts over a substantial range.

3. A telegraph repeater in accordance with claim 2 in which said variable capacitance comprises a plurality of capacitance units and an individual resistor connectable in series with each capacitance unit.

4. A telegraph repeater in accordance with claim 2 in which said variable capacitance comprises a plurality of capacitance units of differing magnitudes and an individual resistor each of differing magnitude connectable in series with each said capacitance unit through said switch, the magnitude of said resistors varying inversely as the magnitude of its respective connected capacitance unit.

5. In a telegraph repeater, a line, a polar relay a line winding on said relay connected to said line, a line balancing winding on said repeater for balancing said line, a circuit connected to said winding for compensating for transient currents, a switch in said circuit operable to any one of several discrete positions, a capacitance unit and a resistor connectable to said balancing winding through said switch in each one of said positions, said capacitance units differing in magnitude, said resistors differing in magnitude inversely proportional to the magnitude of its connected capacitance to afford smooth adjustment of the timing branch and to protect the contacts of said switch.

6. In a communication system, a plurality of capacitance units, a plurality of resistors, each of said resistors connected individually in series with one of said units, a switch operable to a plurality of discrete positions to establish a corresponding plurality of circuit paths through an individual resistor and an individual capacitance unit in series in each path, one path for each switch position, the magnitude of the capacitance of said units differing substantially one from another, the magnitude of the resistance of said resistors inversely proportional to the magnitude of its connected capacitance unit to afford transients uniformly related to the capacitance as said switch is operated and to protect the contacts of said switch.

7. In a communication system, a telegraph repeater, a telegraph line connected to said repeater, a network for balancing said line connected to said repeater, a direct-current balancing branch and a transient-current balancing branch both in said network, a switch in said transient-current balancing branch, a plurality of discrete connecting paths establishable through said switch, an individual capacitance and an individual resistor connected in series in each of said paths, said capacitances differing substantially in magnitude, said resistors differing in magnitude in inverse proportion to the magnitude of its respective connected capacitance to afford a smooth adjustment of the said timing branch and to protect the contacts of said switch.

8. In a communication system, a communication channel, a network for balancing said channel connected to said channel, a transient-current balancing branch in said network, a variable capacitance in said branch, and means in said branch for affording smooth adjustment of said branch, said means comprising a variable impedance connectable to said variable capacitance, said impedance varying in a manner to afford transient currents uniformly related to the capacitance and to protect the contacts of said switch as said capacitance is varied.

9. In a telegraph repeater, a polar telegraph receiving relay, a line, a first line winding on said relay connected to said line, a first balancing winding on said relay, a first balancing network connected between said balancing winding and ground, a first equalizer in said repeater for compensating for differing rates of attenuation of signal components of differing frequencies transmitted over said line, said equalizer consisting of a first inductance connected in series with a first variable resistance, said first equalizer connected on the line side of said relay between said first line winding and said first balancing winding.

10. A telegraph repeater in accordance with claim 9, a second line, a second line winding on said relay connected to said second line, a second balancing winding on said relay, a second balancing network connected to said second balancing winding and a second equalizer identical with said first equalizer consisting of a second inductance connected in series with a second variable resistance connected on the line side of said relay between said second line winding and said second balancing winding.

11. A telegraph repeater, a polar telegraph relay therein, a line winding thereon, a biasing winding thereon, a biasing current control connected to said biasing winding, said control comprising a potentiometer and rheostat so proportioned as to afford constant fineness of adjustment of said current as said rheostat is actuated.

JOSEPH A. MAHONEY.
WILTON T. REA.
CARLETON B. SUTLIFF.

References Cited in the file of this patent

UNITED STATES PATENTS

| Number | Name | Date |
|---|---|---|
| 1,673,697 | Milnor | June 12, 1928 |
| 2,448,635 | Smith | Sept. 7, 1948 |
| 2,523,717 | Pfleger | Sept. 26, 1950 |